United States Patent
Hasegawa et al.

(10) Patent No.: US 9,444,604 B2
(45) Date of Patent: Sep. 13, 2016

(54) COMMUNICATION SYSTEM, COMMUNICATION METHOD AND DATA RECEIVING TERMINAL

(71) Applicant: NEC Corporation, Tokyo (JP)

(72) Inventors: Yohei Hasegawa, Tokyo (JP); Masahiro Jibiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 105 days.

(21) Appl. No.: 14/377,148

(22) PCT Filed: Feb. 13, 2013

(86) PCT No.: PCT/JP2013/000756
§ 371 (c)(1),
(2) Date: Aug. 6, 2014

(87) PCT Pub. No.: WO2013/125175
PCT Pub. Date: Aug. 29, 2013

(65) Prior Publication Data
US 2014/0355472 A1    Dec. 4, 2014

(30) Foreign Application Priority Data
Feb. 21, 2012   (JP) .................................. 2012-035401

(51) Int. Cl.
| | | |
|---|---|---|
| H04L 1/00 | (2006.01) | |
| H04L 5/00 | (2006.01) | |
| H04L 1/18 | (2006.01) | |
| H04L 29/06 | (2006.01) | |
| H04L 1/14 | (2006.01) | |
| H04W 24/08 | (2009.01) | |
| H04L 1/12 | (2006.01) | |

(52) U.S. Cl.
CPC .............. *H04L 5/0055* (2013.01); *H04L 1/14* (2013.01); *H04L 1/1829* (2013.01); *H04L 69/168* (2013.01); *H04L 69/28* (2013.01); *H04W 24/08* (2013.01); *H04L 2001/125* (2013.01)

(58) Field of Classification Search
USPC ........ 370/252, 349, 312, 428, 277, 280, 341, 370/347, 338, 420, 432, 346
See application file for complete search history.

(56) References Cited

U.S. PATENT DOCUMENTS

| | | | | |
|---|---|---|---|---|
| 5,892,759 A | * | 4/1999 | Taketsugu | H04L 1/1809 370/312 |
| 2011/0019555 A1 | | 1/2011 | Gotoh et al. | |
| 2013/0010592 A1 | | 1/2013 | Eguchi | |

FOREIGN PATENT DOCUMENTS

| | | |
|---|---|---|
| JP | 2001-268093 A | 9/2001 |
| JP | 2008-306549 A | 12/2008 |
| JP | 2009-207162 A | 9/2009 |
| JP | 2010-258631 A | 11/2010 |
| WO | WO 2008/032750 A1 | 3/2008 |

OTHER PUBLICATIONS

International Search Report (ISR) (PCT Form PCT/ISA/210), in PCT/JP2013/000756, dated Apr. 2, 2013.
Jiwei Chen, et al., "TCP with delayed ack for wireless networks", [online], Ad Hoc Networks 6 (2008), p. 1098-1116.
Miyoshi, et al, "A Study for Improving TCP Performance on Radio Terminal", IEICE Technical Report, RCS(Radio Communication Systems)2000-265.

* cited by examiner

*Primary Examiner* — Chi H Pham
*Assistant Examiner* — Alexander O Boakye
(74) *Attorney, Agent, or Firm* — McGinn IP Law Group, PLLC

(57) ABSTRACT

A communication system includes a data sending terminal which sends data and a data receiving terminal which sends an acknowledgement, which indicates that the data is received, to the data sending terminal in reply to receiving the data, and the data receiving terminal includes a unit which judges whether it is necessary to resend the acknowledgement on the basis of judgment whether the data receiving terminal receives new data from the data sending terminal within a predetermined time since sending the acknowledgement.

8 Claims, 21 Drawing Sheets

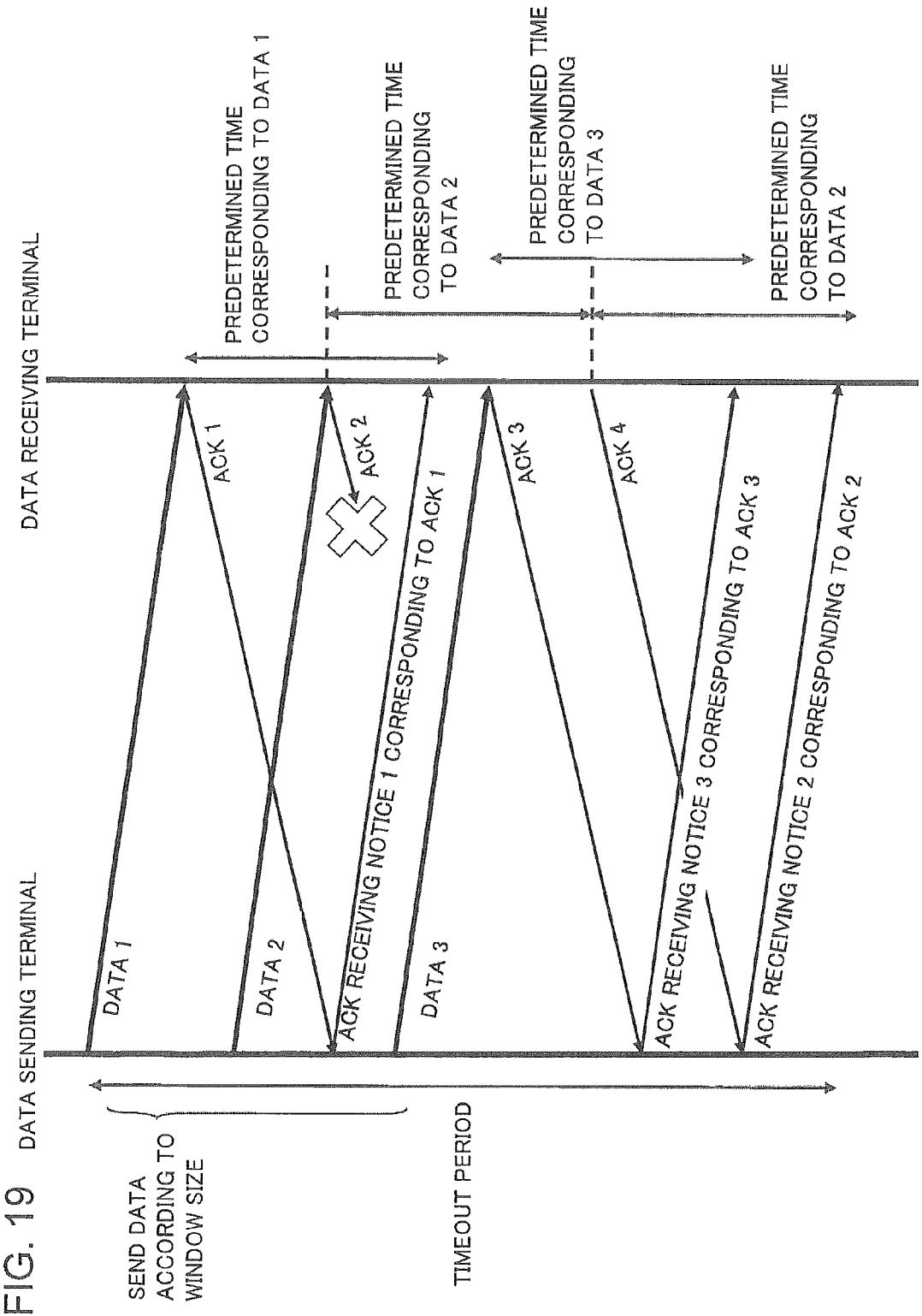

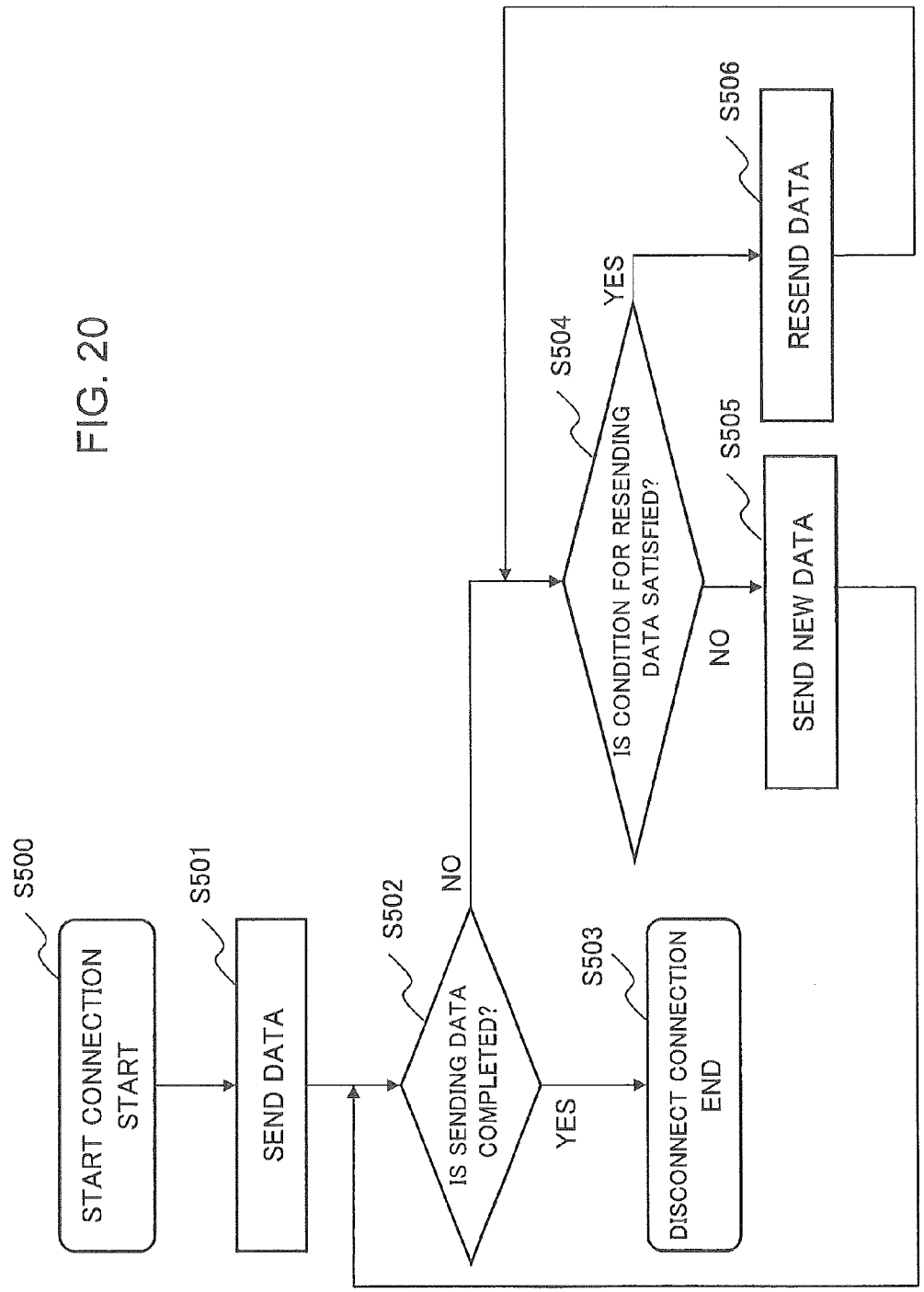

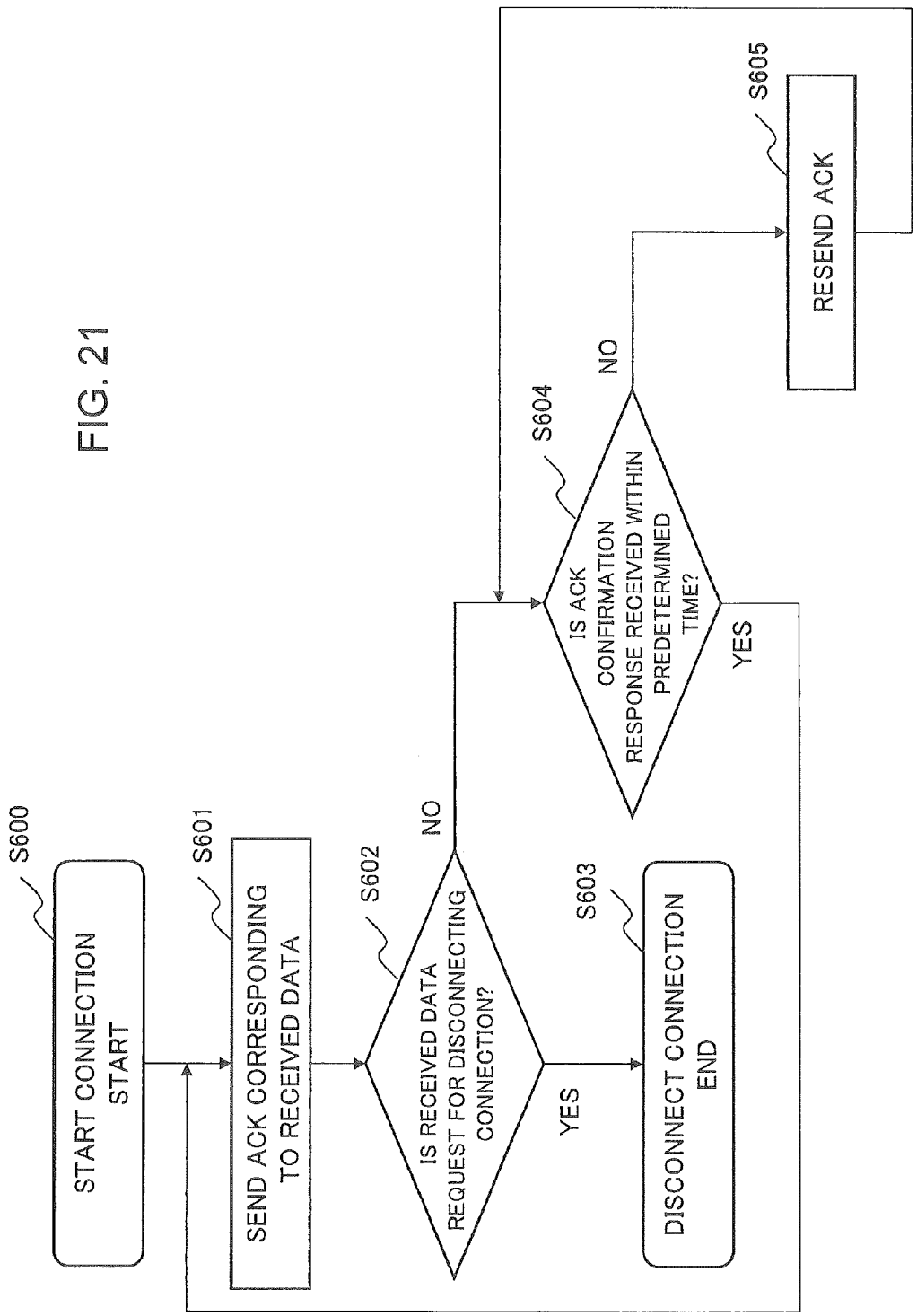

COMMUNICATION SYSTEM, COMMUNICATION METHOD AND DATA RECEIVING TERMINAL

TECHNICAL FIELD

The present invention relates to a communication system and a communication method between terminals which use an acknowledgement corresponding to sending data, and relates to a data receiving terminal which is used in the communication system.

BACKGROUND ART

Data which is sent and received in a communication network includes data which is sent by a data sending terminal, and an ACK (acknowledgement) which is used for informing the data sending terminal that the data has arrived normally.

A patent literature 1 describes that, in a communication system including a data sending terminal which sends data, and a data receiving terminal which receives the data, the data receiving terminal sends ACK, which indicates that the data has been received, to the data sending terminal. By receiving ACK, the data sending terminal can confirm that the data has arrived at the data receiving terminal. On the other hand, in the case that the data sending terminal does not receive ACK within a predetermined time, the data sending terminal judges that the data has not arrived at the receiving terminal, and then resends the data.

Moreover, a patent literature 2 discloses that, in the case that a received ACK is caused an error, a data sending terminal sends ACK resending request data which requests to resend ACK. A data receiving terminal which receives the ACK resending request data resends ACK. By adopting the configuration mentioned above, the data sending terminal receives the resent ACK even if the received ACK is caused the error, and consequently the data sending terminal confirms that the data has arrived at the data receiving terminal.

CITATION LIST

Patent Literature

[PTL 1] Japanese Patent Application Laid-Open Publication No. 2008-306549
[PTL 2] Japanese Patent Application Laid-Open Publication No. 2009-207162

SUMMARY OF INVENTION

Technical Problem

However, there is a case that, while the data which is sent by the data sending terminal arrives at the data receiving terminal, ACK does not arrive at the data sending terminal due to loss of ACK in a communication network.

According to the configuration described in the patent literatures 1 and 2, even in this case, the data sending terminal results in resending the data. As a result, the resend of data, which is unnecessary originally, is carried out, and consequently a problem that throughput of the communication network becomes degraded is caused.

Moreover, the data sending terminal results in making a congestion window narrow since the data sending terminal does not receive ACK. As a result, another problem that the data sending terminal reduces an amount of sending data unnecessarily is caused.

An object of the present invention is to provide a communication system which, even in the case that ACK is lost in a network, can prevent a data sending terminal from resending data, and can prevent the data sending terminal from reducing an amount of sending data.

DISCLOSURE OF INVENTION

Solution to Problem

A communication system of the present invention is characterized in that the communication system includes a data sending terminal which sends data, and a data receiving terminal which sends an acknowledgement, which indicates that the data is received, to the data sending terminal in reply to receiving the data, and the data receiving terminal judges whether it is necessary to resend the acknowledgement on the basis of judgment whether the data receiving terminal receives new data from the data sending terminal within a predetermined time since sending the acknowledgement.

A data receiving terminal of the present invention is characterized in that the data receiving terminal receives data which is sent by a data sending terminal, and sends an acknowledgement, which indicates that the data is received, to the data sending terminal in reply to receiving the data, and judges whether it is necessary to resend the acknowledgement on the basis of judgment whether the data receiving terminal receives new data from the data sending terminal within a predetermined time since sending the acknowledgement.

A communication method of the present invention is characterized by comprising a step of sending an acknowledgement, which indicates that data sent by a data sending terminal is received, to the data sending terminal in reply to receiving the data, and a step of judging whether it is necessary to resend the acknowledgement on the basis of judgment whether the data receiving terminal receives new data from the data sending terminal within a predetermined time since sending the acknowledgement.

Advantageous Effect of Invention

According to the present invention, it is possible to prevent the data sending terminal from resending the data even in the case that ACK is lost in the network. Moreover, even in the case that ACK is lost in the network, it is possible to prevent the data sending terminal from reduce an amount of sending data.

DESCRIPTION OF EMBODIMENTS

Hereinafter, specific exemplary embodiments, which apply the present invention, will be described in detail with reference to drawings.

First Exemplary Embodiment of the Present Invention

Figure 1:
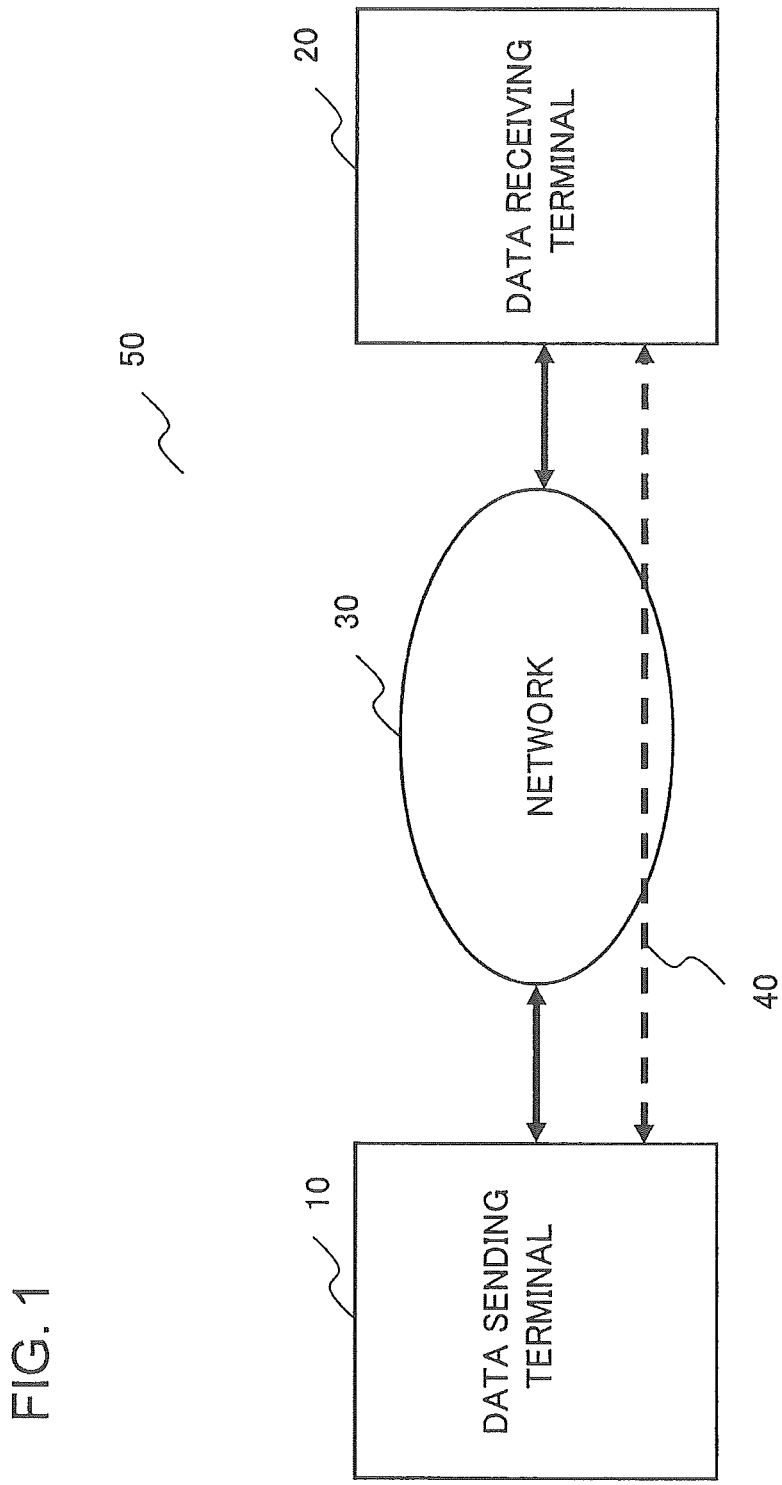
FIG. 1 A block diagram showing an example of a configuration of a communication system according to a first exemplary embodiment FIG. 2 A sequence diagram showing an example of a data transaction which is carried out between a data sending terminal and a data receiving terminal in the case that the data sending terminal carries out resending control by use of timeout FIG. 3 A block diagram showing an example of a configuration of the data receiving terminal in the first exemplary embodiment of the present invention FIG. 4 A sequence diagram showing an example of the data transaction which is carried out between the data sending terminal and the data receiving terminal in the first exemplary embodiment of the present invention FIG. 5 A sequence diagram showing another example of the data transaction which is carried out between the data sending terminal and the data receiving terminal in the first exemplary embodiment of the present invention FIG. 6 A flowchart showing an example of a procedure of an operation of the data sending terminal in the first exemplary embodiment of the present invention FIG. 7 A flowchart showing an example of the procedure of the operation of the data sending terminal in the first exemplary embodiment of the present invention FIG. 8 A block diagram showing an example of a configuration of a data sending terminal in a second exemplary embodiment of the present invention FIG. 9 A block diagram showing an example of a configuration of a data receiving terminal in the second exemplary embodiment of the present invention FIG. 10 A flowchart showing an example of a procedure of an operation of the data receiving terminal in the second exemplary embodiment of the present invention FIG. 11 A sequence diagram showing an example of a data transaction which is carried out between the data sending terminal and the data receiving terminal in the case that the data sending terminal carries out resending control by use of a duplicate ACK FIG. 12 A sequence diagram showing an example of a data transaction which is carried out between a data sending terminal and a data receiving terminal in a third exemplary embodiment of the present invention FIG. 13 A block diagram showing an example of a configuration of the data sending terminal in the third exemplary embodiment of the present invention FIG. 14 A sequence diagram showing an example of the data transaction which is carried out between the data sending terminal and the data receiving terminal FIG. 15 A flowchart showing an example of a procedure of an operation of the data sending terminal in the third exemplary embodiment of the present invention FIG. 16 A sequence diagram showing an example of a data transaction which is carried out between a data sending terminal and a data receiving terminal in a fourth exemplary embodiment of the present invention FIG. 17 A sequence diagram showing an example of the data transaction which is carried out between the data sending terminal and the data receiving terminal FIG. 18 A block diagram showing an example of a configuration of a data sending terminal in a fifth exemplary embodiment of the present invention FIG. 19 A sequence diagram showing an example of a data transaction which is carried out between the data sending terminal and a data receiving terminal in the fifth exemplary embodiment of the present invention FIG. 20 A flowchart showing an example of a procedure of an operation of the data sending terminal in the fifth exemplary embodiment of the present invention FIG. 21 A flowchart showing an example of the procedure of the operation of the data receiving terminal in the fifth exemplary embodiment of the present invention

FIG. 1 is a diagram showing an example of a configuration of a communication system 50 according to a first exemplary embodiment of the present invention.

The communication system 50 includes a data sending terminal 10 and a data receiving terminal 20 which are connected each other through a network 30. The data sending terminal 10 and the data receiving terminal 20 send and receive data, for example, by use of a TCP connection 40.

The data sending terminal 10 is equipment which sends data, and the data receiving terminal 20 is equipment which receives the data sent by the data sending terminal 10. When the data receiving terminal 20 receives the data, the data receiving terminal 20 sends an acknowledgement (ACK), which is corresponding to the data, to the data sending terminal.

Here, an operation of the data sending terminal 10 is based on, for example, TCP/IP (transmission control protocol/internet protocol), and the data sending terminal 10 carries out resending control by use of timeout.

Figure 2:
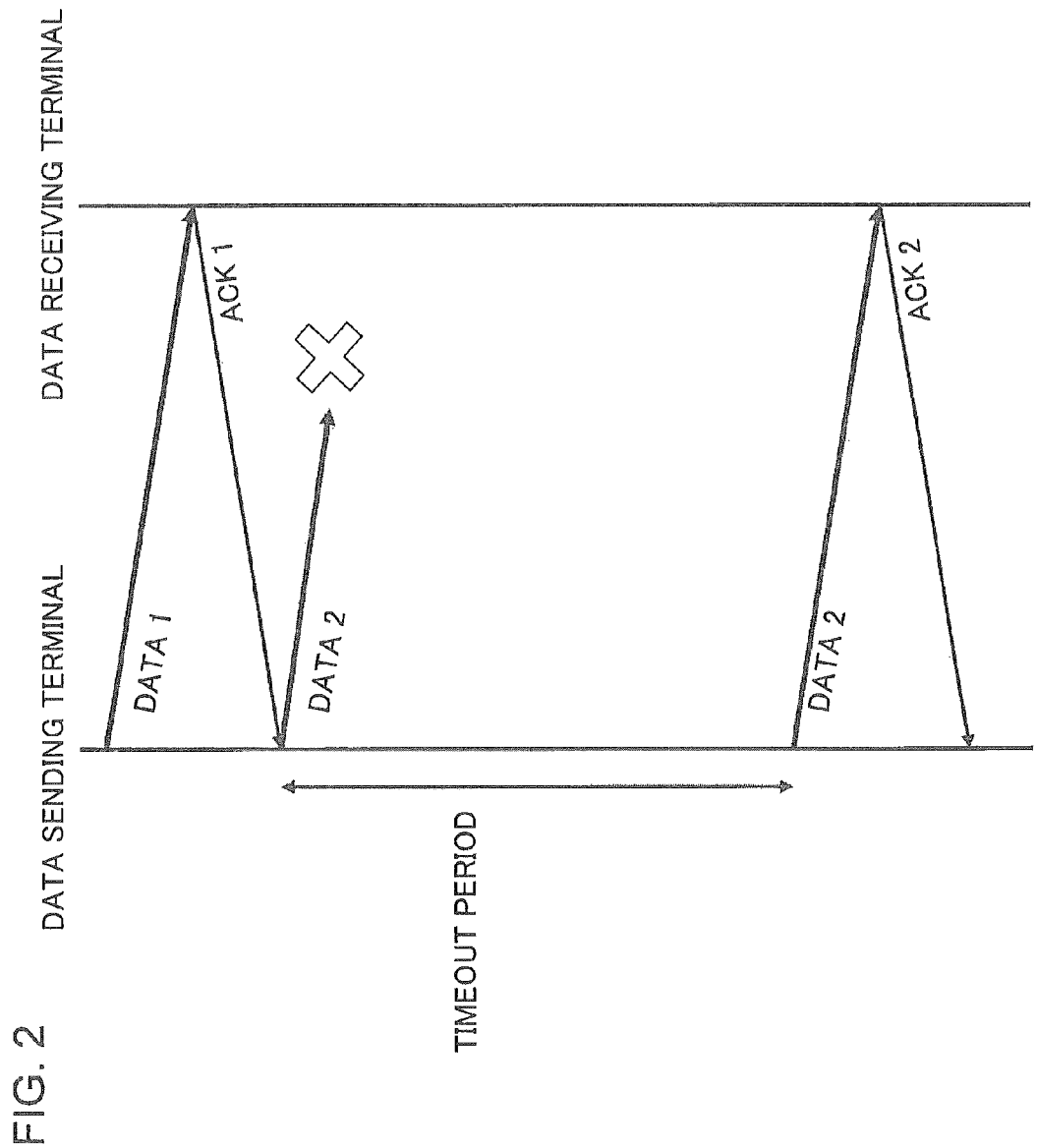

The resending control by use of the timeout will be described in the following with reference to a sequence diagram shown in FIG. 2. As shown in FIG. 2, in the case that the data sending terminal does not receive ACK corresponding to the sending data within a timeout period, the data sending terminal resends the data. An example shown in FIG. 2 shows a case that data 2 which the data sending terminal 10 sends is lost on a sending path due to an error. In this case, since the data receiving terminal 20 cannot receive the data 2, the data receiving terminal 20 cannot send back ACK 2. As a result, the data sending terminal 10 resends the data 2 since the data sending terminal 10 cannot receive ACK 2 within the timeout period. Moreover, while not shown in the example of FIG. 2, there is another case that the data 2 which is sent by a data sending terminal 2 arrives at the data receiving terminal 20, but ACK 2 which is sent back by the data receiving terminal 20 is lost on a sending path. Also in this case, the data sending terminal 10 cannot receive ACK 2 within the timeout period, and consequently resends the data 2. For example, the timeout period is a time interval, at which the data sending terminal resends data, in the case of TCP/IP.

Moreover, for example, in the case of TCP/IP, the timeout period is used for judging whether an amount of sending data sent by the data sending terminal decreases. That is, in the case that the data sending terminal does not receive ACK, which is corresponding to the data sent by the data sending terminal, within the timeout period since the data sending terminal sent the data, the data sending terminal reduces an amount of the sending data. Here, for example, in the case of TCP/IP, since the timeout period is not prescribed as the protocol, any timeout period may be adopted.

Figure 3:
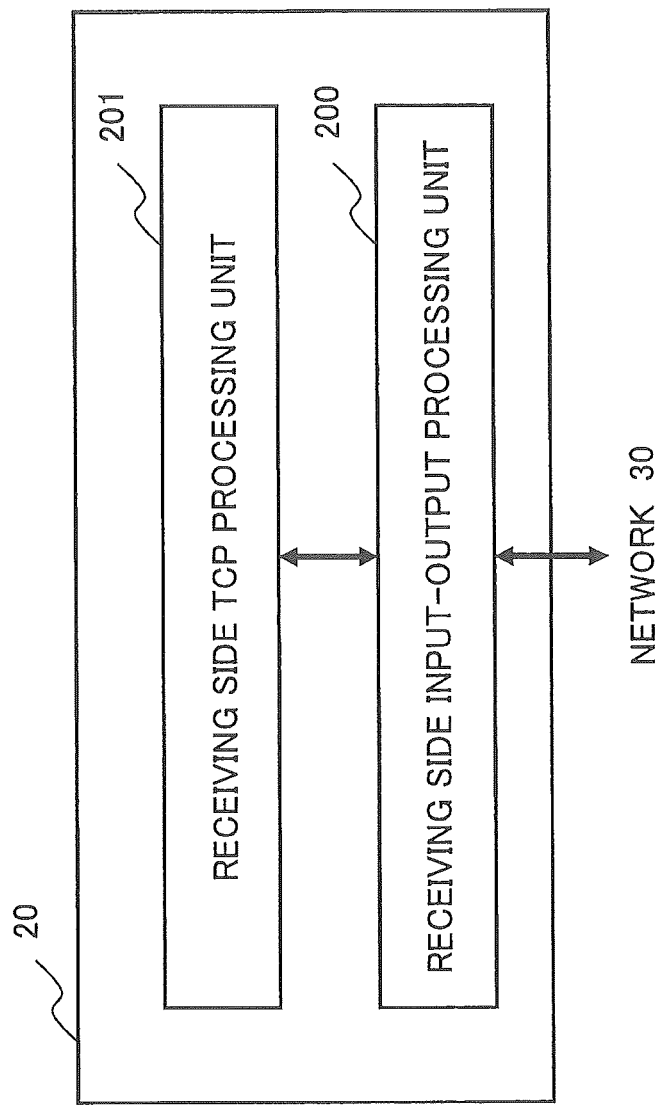

Next, an example of a configuration of the data receiving terminal 20 in the first exemplary embodiment of the present invention will be described with reference to FIG. 3. As shown in FIG. 3, the data receiving terminal 20 includes a receiving side input-output processing unit 200. Moreover, the data receiving terminal 20 includes a receiving side TCP processing unit 201.

The receiving side input-output processing unit 200 sends and receives data and ACK. For example, the receiving side input-output processing unit 200 receives the data which is sent by the data sending terminal 20. Moreover, the receiving side input-output processing unit 200 sends ACK to the data sending terminal 20 in reply to receiving the data.

The receiving side TCP processing unit 201 judges whether it is necessary to resend ACK on the basis of judgment whether the receiving side input-output unit 200 receives new data from the data sending terminal within a predetermined time since the data receiving terminal sent ACK to the data sending terminal.

Specifically, the receiving side TCP processing unit 201 judges that it is necessary to resend ACK on the basis of judgment that the data receiving terminal does not receive new data from the data sending terminal within the predetermined time. Then, the receiving side TCP processing unit 201 sends ACK to the data sending terminal through the receiving side input-output processing unit 200.

On the other hand, the receiving side TCP processing unit 201 judges that it is unnecessary to resend ACK on the basis of judgment that the data receiving terminal receives new data from the data sending terminal within the predetermined time. Then, the receiving side input-output processing unit 200 sends ACK corresponding to the new data to the data sending terminal 10.

As the predetermined time, 50 ms which is used in 'Fast Timer' of the timer mechanism installed in TCP is applicable. But, it is unnecessary that the predetermined time has a fixed value, and the predetermined time may have any value.

Here, in the case that the data sending terminal 10 carries out the resending control by use of the timeout, the data receiving terminal may set the predetermined time shorter than the timeout period which is used in the data sending terminal 10. If the predetermined time is shorter than the timeout period, the data receiving terminal 20 can resend ACK before the timeout period expires.

Accordingly, the data sending terminal 10 can receive the resent ACK within the timeout period even if ACK is lost in the network. As a result, the communication system 50, which includes the data receiving terminal 20, can avoid the unnecessary resending of the data, and can maintain an amount of the sending data.

Next, an example of a communication procedure, which is carried out by the data sending terminal 10 and the data receiving terminal 20, according to the first exemplary embodiment of the present invention will be explained with reference to FIG. 4 and FIG. 5. Here, it is assumed that a part of the procedure which is not described in the specification is based on, for example, the communication operation of TCP/IP.

Figure 4:
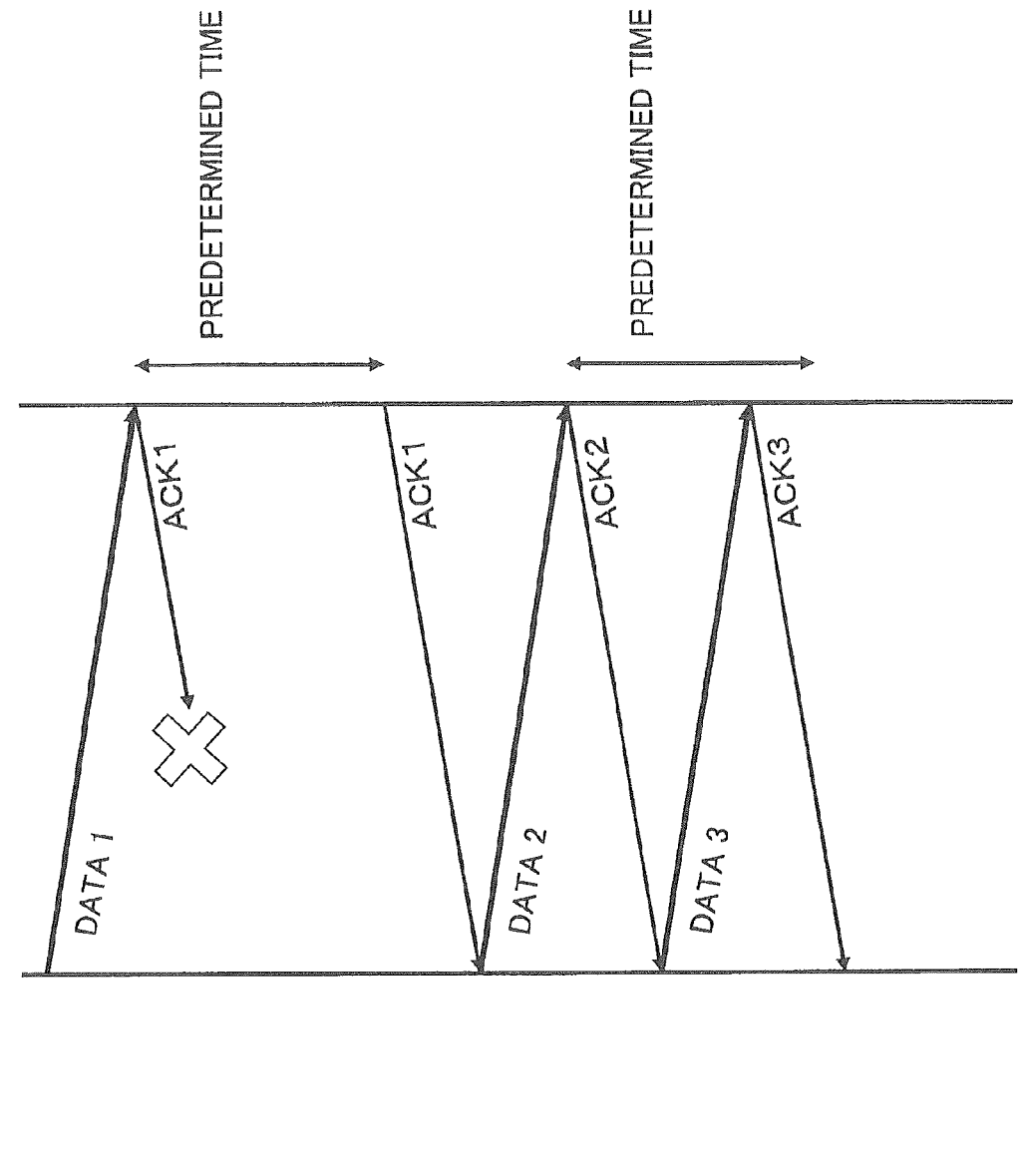

FIG. 4 is a sequence diagram showing an example of a data transaction which is carried out between the data sending terminal 10 and the data receiving terminal 20. According to the example shown in FIG. 4, the data sending terminal 10 carries out the resending control by use of the timeout, for example, based on TCP/IP.

According to the example shown in FIG. 4, the data sending terminal 10 sends data 1 to the data receiving terminal 20. The data receiving terminal 20, which receives the data 1, sends ACK 1, which is corresponding to the data 1, to the data sending terminal 10. Here, according to the example shown in FIG. 4, ACK 1 is lost in the network, and consequently does not arrive at the data sending terminal 10. The data sending terminal 10 does not send data 2 since the data sending terminal 10 does not receive ACK 1. Therefore, the data receiving terminal 20 judges that it is necessary to resend ACK 1 on the basis of judgment that the data receiving terminal 20 does not receive new data from the data sending terminal 10 within the predetermined time, and then resends ACK 1. As a result, the data sending terminal 10 receives the resent ACK 1, and sends the data 2 in reply to the received ACK 1. Note that, while not shown in FIG. 4, the data receiving terminal 20 may start measuring the predetermined time, which is used for judging whether it is necessary to resend ACK, when resending ACK 1.

The data receiving terminal 20, which receives the data 2, sends ACK 2, which is corresponding to the data 2, to the data sending terminal 10. Here, according to the example shown in FIG. 4, ACK 2 is not lost in the network, and consequently arrives at the data sending terminal 10. The data sending terminal 10 send data 3 in reply to receiving ACK 2. The data receiving terminal 20 receives the data 3, which is sent by the data sending terminal 10, within the predetermined time since the data receiving terminal 20 sent ACK2. Therefore, the data receiving terminal 20 judges that it is unnecessary to resend ACK 2, and then sends ACK 3 which is corresponding to the data 3.

Figure 5:
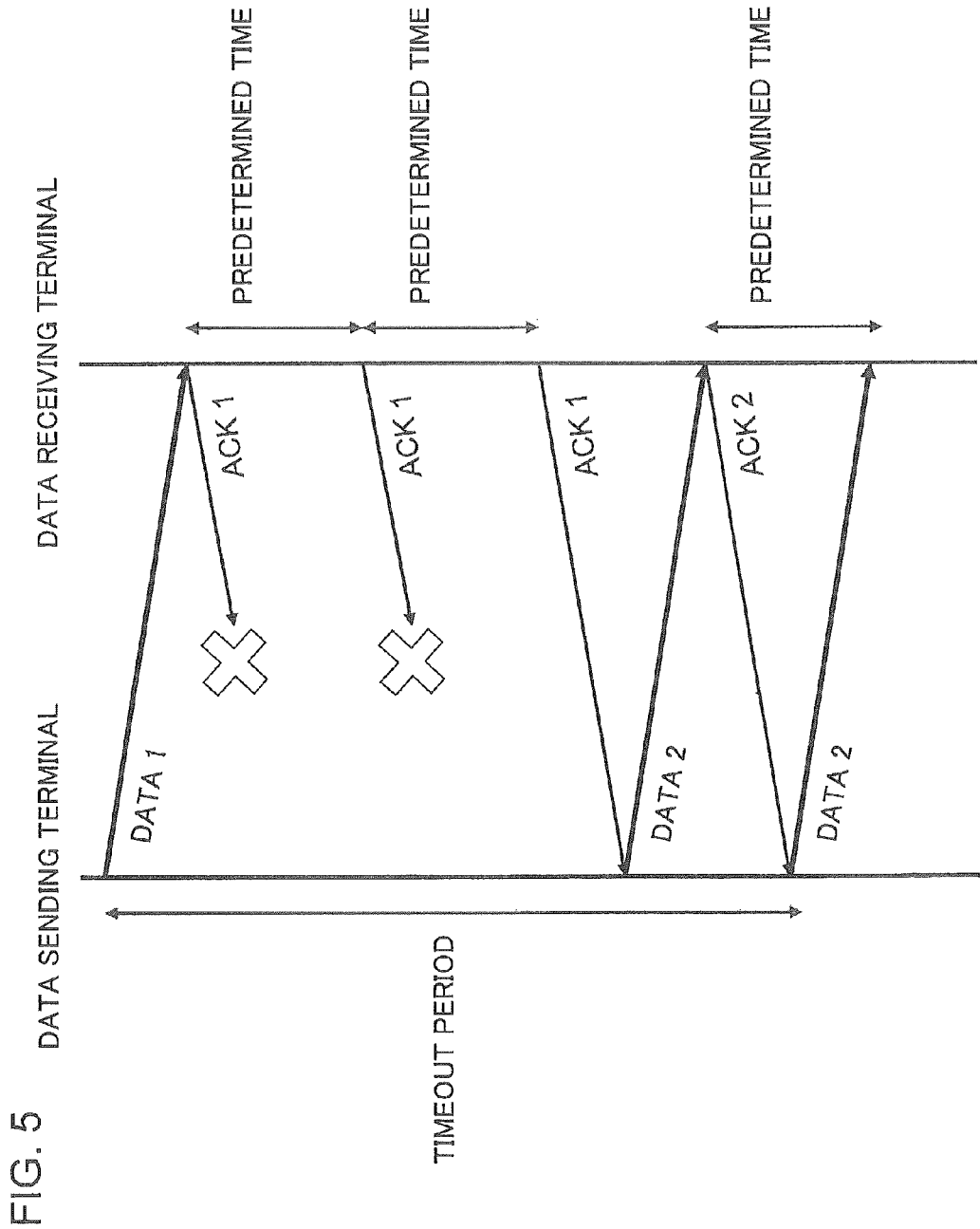

FIG. 5 is a sequence diagram showing another example of the data transaction which is carried out between the data sending terminal 10 and the data receiving terminal 20. FIG. 5 show a case that, in the example shown in FIG. 4, ACK 1 resent by the data receiving terminal 20 is lost in the network.

The data receiving terminal 20 judges that it is necessary to resend ACK 1 again on the basis of judgment that the data receiving terminal 20 does not receive new data from the data sending terminal within the predetermined time since the data receiving terminal 20 resent ACK 1, and furthermore resends ACK 1. As a result, the data sending terminal 10 receives ACK 1 which is resent again, and sends data 2 in reply to the received ACK 1.

Figure 6:
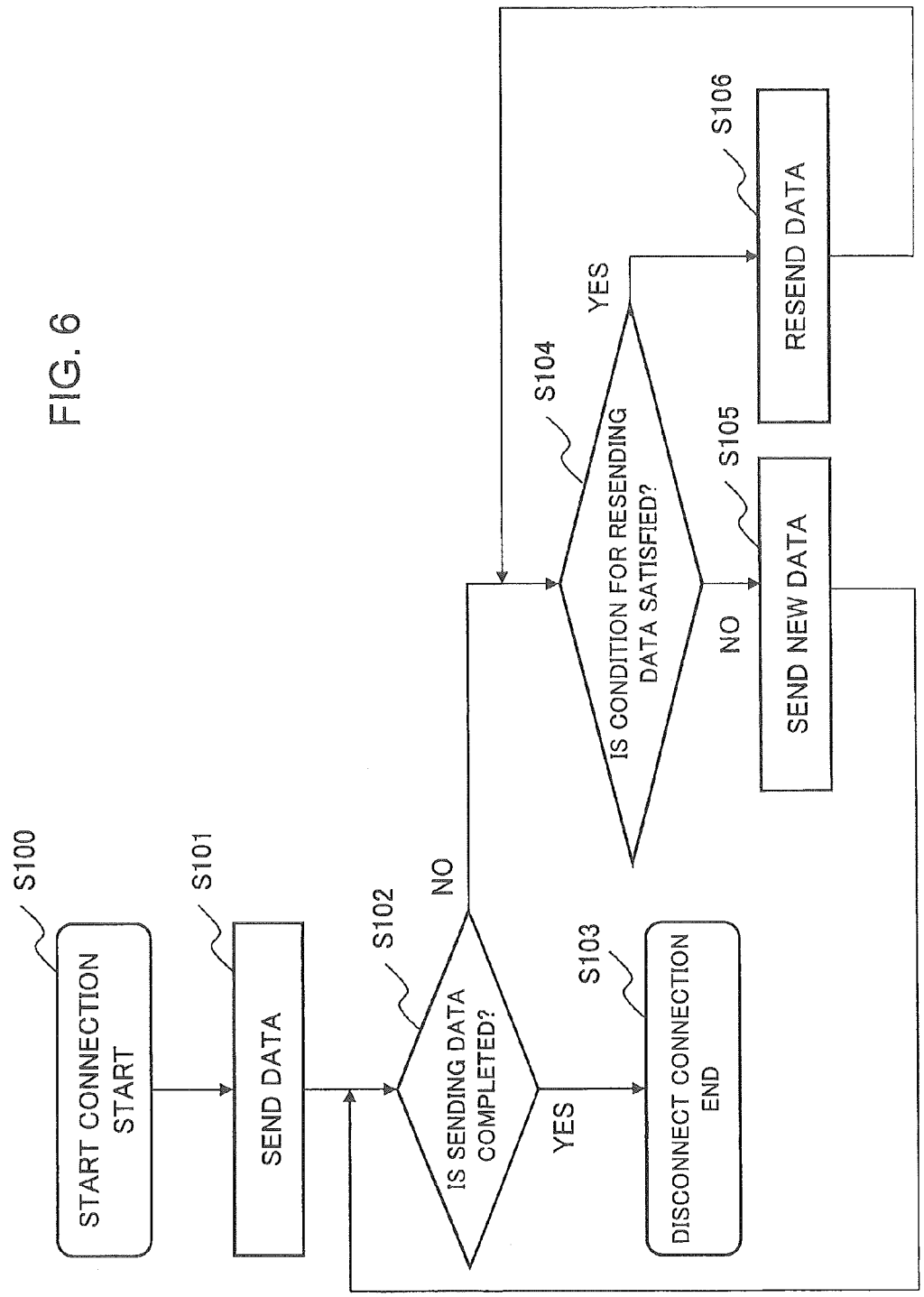

Next, an example of an operation of the data sending terminal 10 according to the first exemplary embodiment of the present invention will be described. FIG. 6 is a flowchart showing an example of a procedure of the operation of the data sending terminal 10.

As shown in FIG. 6, in the case that data to be sent is generated, the data sending terminal 10 sends a request for starting connection to the data receiving terminal 20, and then starts the connection (S100).

In Step 101 (S101), the data sending terminal 10 sends data to the data receiving terminal 20.

In Step 102 (S102), the data sending terminal 10 judges whether a process of sending a series of data which should be sent to the data receiving terminal 20 is completed. A series of data are, for example, data whose sequence numbers are 1 to 10 (for example, data 1 to data 10). In the case of the example, the data sending terminal 10 judges whether a process of sending the data 1 to data 10 is completed.

In the case that the process of sending the data is completed, the data sending terminal 10 advances the procedure to Step 103 (S103), sends a request for disconnecting the connection to the data receiving terminal 20 and disconnects the connection.

On the other hand, in the case that the process of sending the data is not completed, the data sending terminal 10 advances the procedure to Step 104 (S104) and judges whether it is necessary to resend the data.

The data sending terminal 10 judges whether a condition for resending data is satisfied (S104). An example of the condition for resending data is 'timeout'. The data sending terminal 10 judges whether the data sending terminal 10 receives ACK, which is corresponding to data sent by the data sending terminal 10, within a timeout period since the data sending terminal 10 sent the data.

In the case that the data sending terminal 10 receives ACK within the timeout period, the data sending terminal 10 sends new data (S105).

On the other hand, in the case that the data sending terminal 10 does not receive ACK within the timeout period, the data sending terminal 10 resends the data (S106). In the case of resending the data, the data sending terminal 10 judges again whether the condition for resending data is satisfied.

Figure 7:
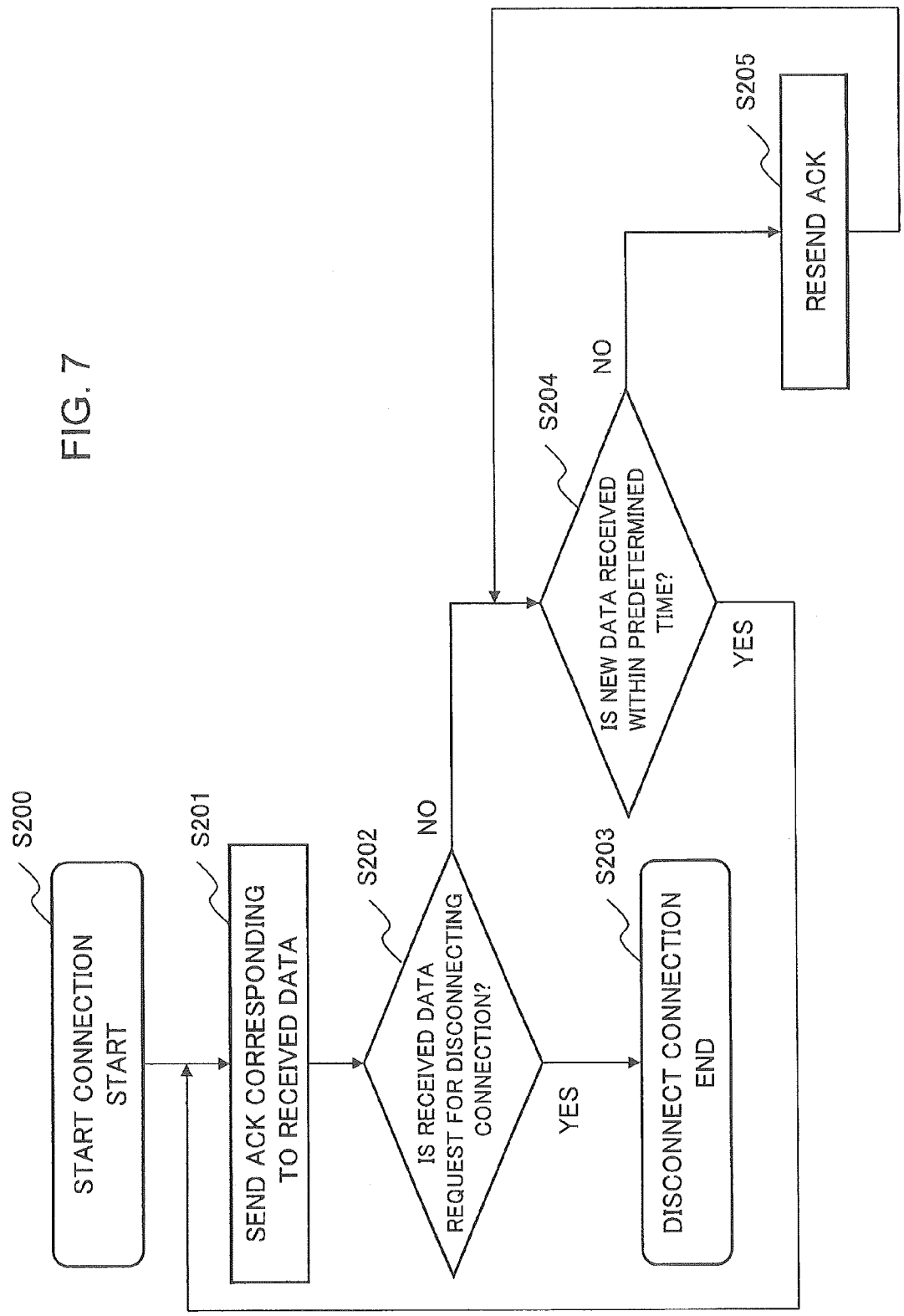

Next, an example of an operation of the data receiving terminal 20 according to the first exemplary embodiment of the present invention will be described. FIG. 7 is a flowchart showing an example of a procedure of the operation of the data receiving terminal 20.

As shown in FIG. 7, the data receiving terminal 20 receives the request for starting connection which is issued by the data sending terminal 10, and then starts the connection (S200).

In Step 201 (S201), the data receiving terminal 20 sends ACK which is corresponding to received data.

In Step 202 (S202), the data receiving terminal 20 judges whether the data received from the data sending terminal 10 is corresponding to data which indicates disconnection of connection (FIN).

In the case that the data receiving terminal 20 judges that the data received from the data sending terminal 10 is the data which indicates the disconnection of connection (FIN), the data receiving terminal 20 advance the procedure to Step 203 (S203). That is, the data receiving terminal 20 sends a response (FIN/ACK) which is corresponding to the data indicating the disconnection of connection, and then disconnects the connection.

On the other hand, in the case that the data receiving terminal 20 judges that the data received from the data sending terminal 10 is not the data which indicates the disconnection of connection, the data receiving terminal 20 advance the procedure to Step 204 (S204). Then, the data receiving terminal 20 judges whether the data receiving terminal 20 receives new data from the data sending terminal 10 within a predetermined time since the data receiving terminal 20 sent ACK.

In the case that the data receiving terminal 20 receives the new data within the predetermined time, the data receiving terminal 20 returns the procedure to Step 201 (S201).

On the other hand, in the case that the data receiving terminal 20 does not receive new data within the predetermined time, the data receiving terminal 20 resends ACK in Step 205 (S205), and advances the procedure to Step 204.

As mentioned above, according to the first exemplary embodiment of the present invention, the data receiving terminal 20 resends ACK in the case that the data receiving terminal 20 does not receive new data within the predetermined time. Therefore, by the resent ACK's arriving at the data sending terminal 10, it is possible to prevent the data from being resent unnecessarily even if ACK is lost in the network. Moreover, since the data sending terminal 10 receives the resent ACK, the data sending terminal 10 can continue data communication without decreasing an amount of the sending data.

Second Exemplary Embodiment of the Present Invention

According to a second exemplary embodiment of the present invention, the receiving side TCP processing unit 201 calculates a predetermined time by use of the maximum data size and RTT.

A configuration of the second exemplary embodiment of the present invention is, for example, the same as the configuration of the communication system 50 according to the first exemplary embodiment shown in FIG. 1.

Figure 8:
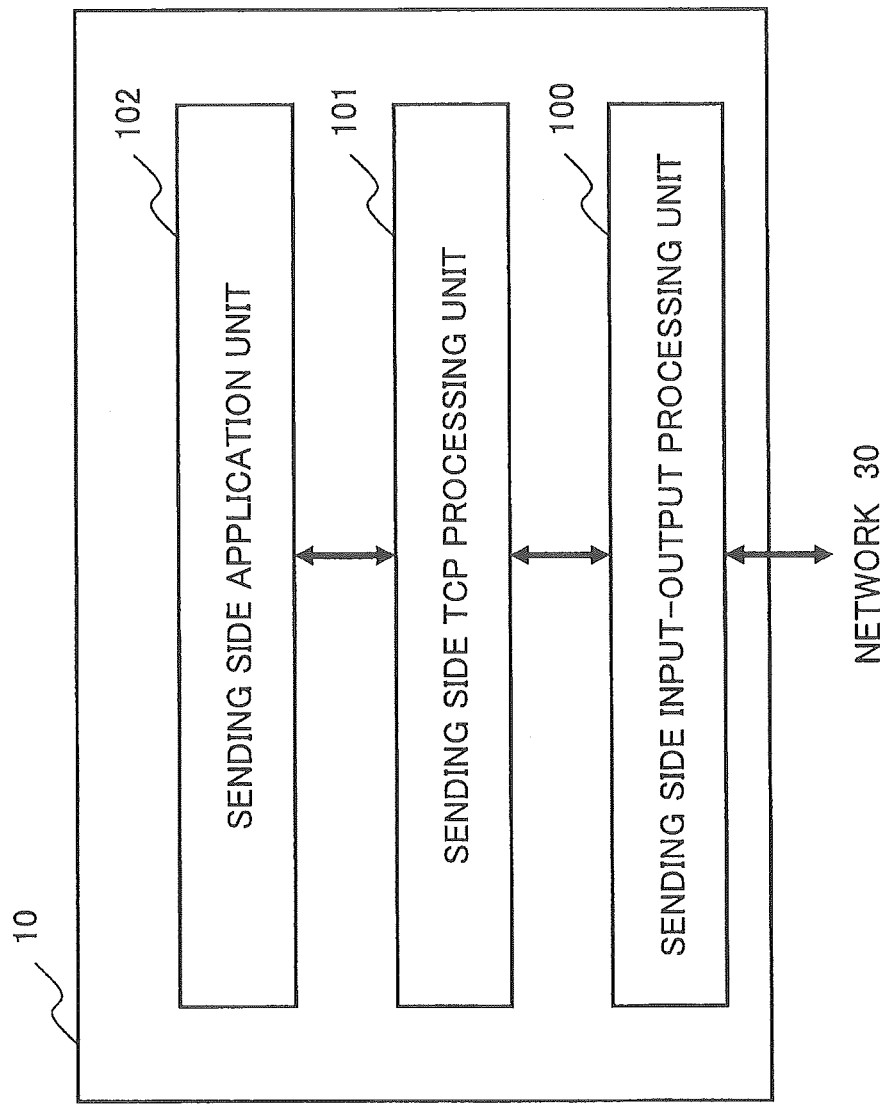

FIG. 8 is a diagram showing an example of a configuration of the data sending terminal 10 in the second exemplary embodiment. As shown in FIG. 8, the data sending terminal 10 includes a sending side input-output processing unit 100 which sends and receives data and ACK. Moreover, the data sending terminal 10 includes a sending side TCP processing unit 101. Furthermore, the data sending terminal 10 includes a sending side application unit 102 which generates data to be sent.

The sending side input-output processing unit 100 sends and receives data and ACK. For example, the sending side input-output processing unit 100 sends data to the data receiving terminal 20. Moreover, the sending side input-output processing unit 100 receives ACK which the data receiving terminal 20 sends.

The sending side TCP processing unit 101 segments data received from the sending side application unit 102, and controls a sending rate. Moreover, the sending side TCP processing unit 101 carries out a process for realizing reliable communication by use of TCP connection to data with carrying out the arrival check by use of ACK and with sequence control of sending data by use of sequence number.

Figure 9:
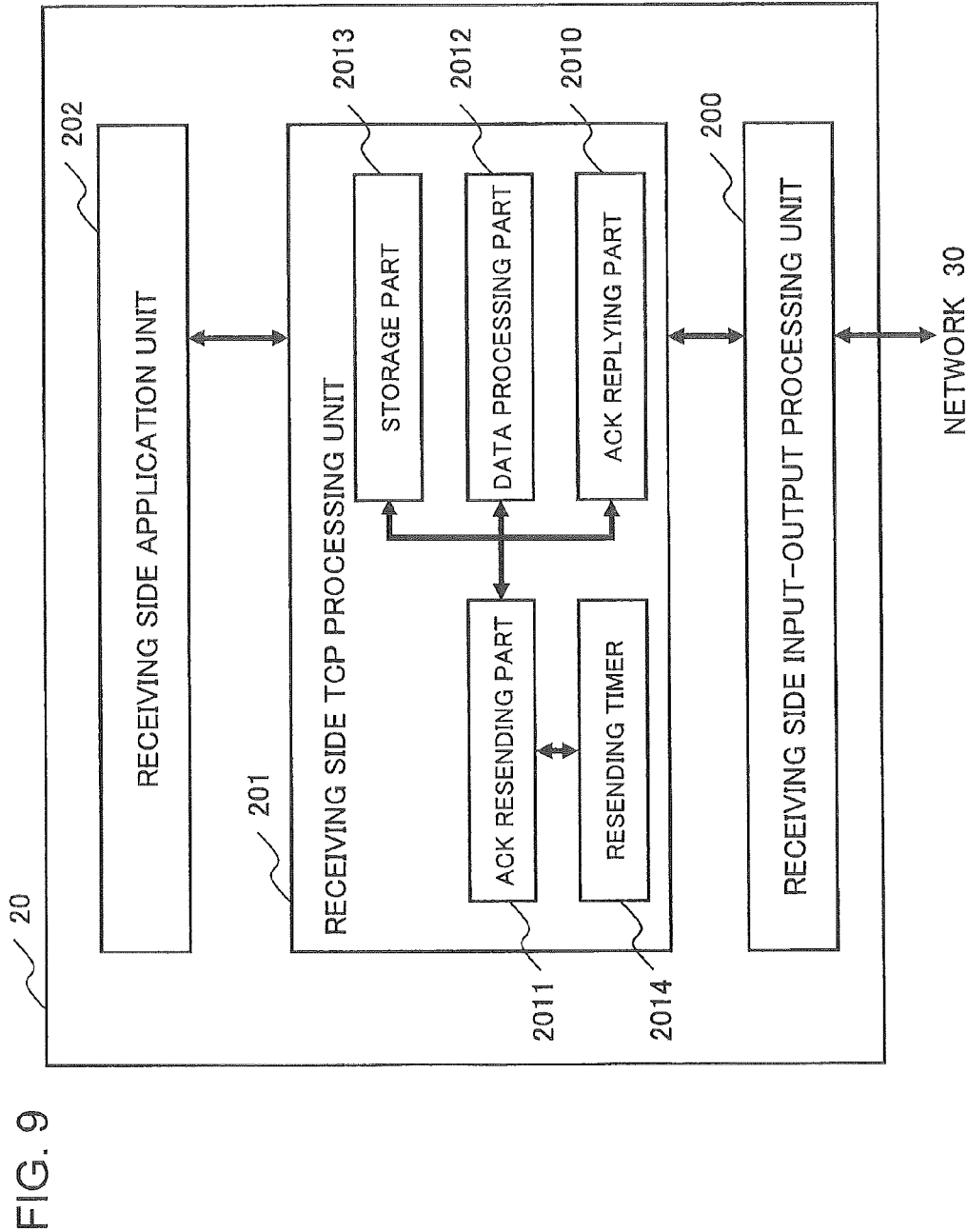

FIG. 9 is a diagram showing an example of a configuration of the data receiving terminal 20 in the second exemplary embodiment. As shown in FIG. 9, the data receiving terminal 20 includes the receiving side input-output processing unit 200 and the receiving side TCP processing unit 201 similarly to the data receiving terminal 20 according to the first exemplary embodiment. Moreover, the data receiving terminal 20 includes a receiving side application unit 202 which receives the data sent by the data sending terminal 10.

The receiving side TCP processing unit 201 includes an ACK replying part 2010 which replies ACK corresponding to the received data. Moreover, the receiving side TCP processing unit 201 includes an ACK resending part 2011 which controls to resend ACK corresponding to the received data. Moreover, the receiving side TCP processing unit 201 includes a data processing part 2012 which carries out a process to data. Moreover, the receiving side TCP processing unit 201 includes a storage part 2013 which stores the data received previously, and ACK sent previously. Furthermore, the receiving side TCP processing unit 201 includes a resending timer 2014 which is activated by the data receiving terminal 20's sending ACK.

The resending timer 2014 measures an elapse time since ACK was sent. The resending timer 2014 stops measuring the elapse time in the case that the data receiving terminal 20 receives new data from the data sending terminal 10.

In the case that the data receiving terminal 20 does not receive new data from the data sending terminal 10, and the elapse time measured by the resending timer 2014 reaches a predetermined time, the ACK resending part 2011 resends ACK.

In the second exemplary embodiment, the ACK resending part 2011 can calculate the predetermined time, for example, according to the following formula (1). However, the predetermined time calculated according to the formula (1) is a mere example, and any value which the ACK resending part 2011 calculates as the predetermined time may be applied.

$$(\text{predetermined time}) = 1/\{\alpha \times (\text{RWIN}/\text{maximum data size})/\text{RTT}\} \quad \text{formula (1)}$$

In the formula (1), RWIN (Receive Window) means a window size of which the data receiving terminal 20 informs the data sending terminal 10 as a receivable amount of data. Moreover, RTT (Round trip Time) means a period from a time when the data sending terminal 10 sends data until a time when the data sending terminal 10 receives ACK sent by the data receiving terminal 20. The maximum data size means a maximum amount of data which the data sending terminal sends. $\alpha$ means a coefficient for absorbing variation in an arrival time of data, and $\alpha$ is, for example, larger than 1 (for example, $\alpha$ may be an integer or a decimal).

Here, in the formula (1), RWIN/RTT is an assumed maximum data transfer speed, and number of data transfers per a unit time is calculated through dividing RWIN/RTT by the maximum data size. Next, the data arrival interval at a time when the data transfer is carried out with assumed maximum throughput is obtained by calculating a reciprocal of the number of data transfers per the unit time.

The ACK resending part 2011 acquires the measured maximum data size and RTT, and estimates the data arrival interval by use of the formula (1). Then, in the case that the elapse time since ACK is sent reaches the data arrival interval (that is, predetermined time), the ACK resending part 2011 resends ACK. The ACK resending part 2011 may calculate RTT by use of records of data and ACK which were sent and received previously between the data sending terminal and the data receiving terminal. In this case, the ACK resending part 2011 checks the records of the data and ACK, which the data receiving terminal 20 sent and received previously, with reference to the storage part 2013.

In the case that ACK is resent, the resending timer 2014 stops measuring the elapse time. Afterward, the resending timer 2014 starts measuring an elapse time since ACK was resent. Then, in the case that the elapse time since ACK was resent reaches a second predetermined time, the data receiving terminal 20 resends ACK again. It is not always necessary that the data receiving terminal 20 uses the second predetermined time when the data receiving terminal 20 resends ACK, and the data receiving terminal 20 may use the predetermined time calculated by use of the formula (1) at the time when the data receiving terminal 20 resends ACK.

It is assumed that the second predetermined time is $\beta$ times longer than the predetermined time which is calculated by use of the formula (1). For example, $\beta$ is larger than 1 (for example, $\beta$ may be an integer or a decimal). Moreover, the second predetermined time may be identical with the predetermined time calculated by use of the formula (1).

In the case that the data receiving terminal 20 resends ACK again after the second predetermined time expires, a total of the predetermined time and the second predetermined time may be set shorter than the timeout period used in the data sending terminal 10. By virtue of the above-mentioned setting, the data sending terminal 10 can receive ACK resent again within the timeout period even if both of an ACK and the resent ACK are lost in the network.

As mentioned above, the data receiving terminal 20 resends ACK repeatedly until receiving data or new data.

Here, while the resending timer 2014 stops measuring the elapse time in the case that ACK is resent according to the example mentioned above, the resending timer 2014 may continue measuring the elapse time. In this case, the data receiving terminal 20 determines a plurality of predetermined times for resending ACK, and resends ACK every time when the elapse time reaches the corresponding predetermined time.

Figure 10:
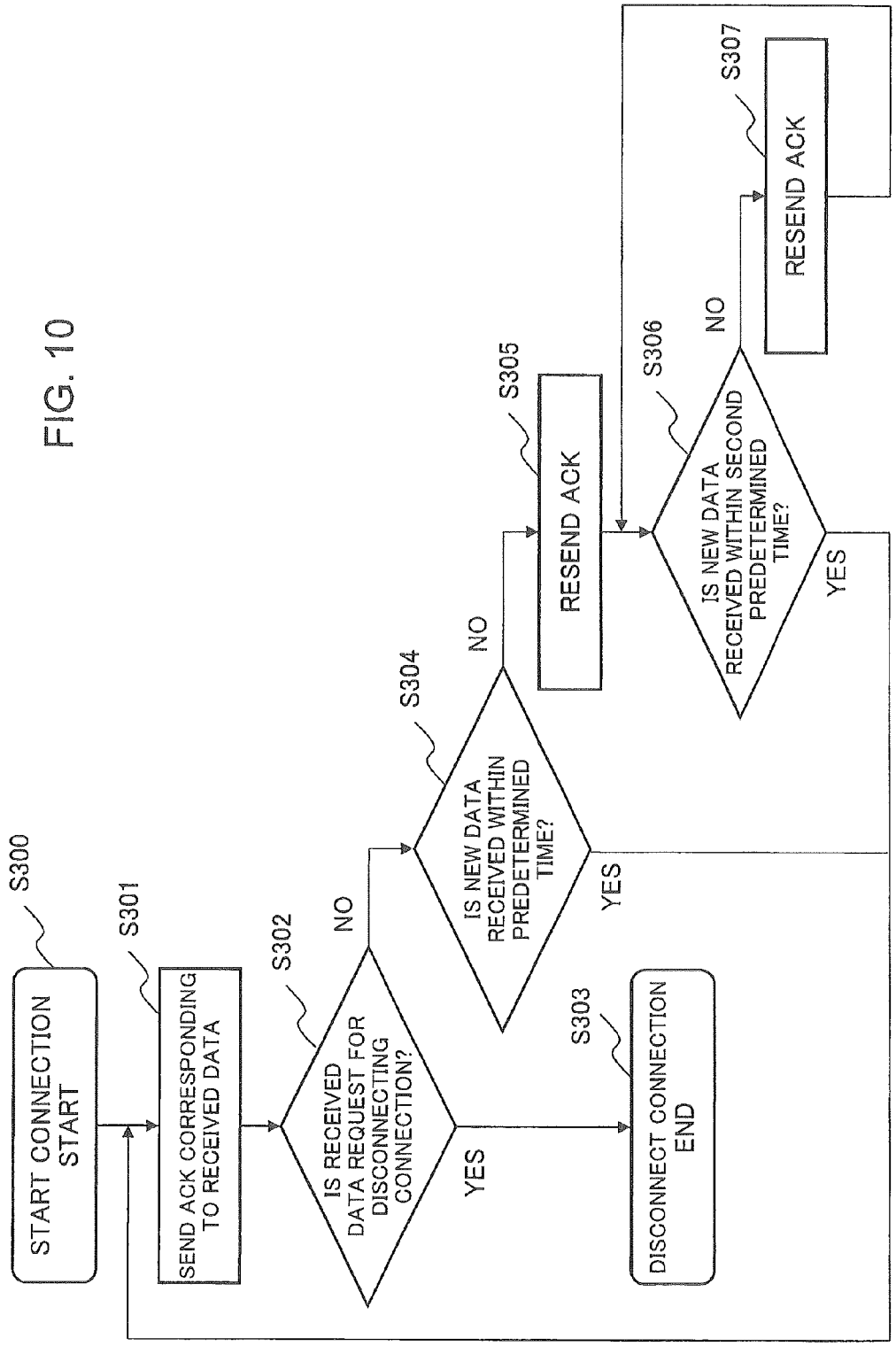

Next, an example of an operation of the data receiving terminal 20 according to the second exemplary embodiment of the present invention will be described. FIG. 10 is a flowchart showing an example of a procedure of the operation of the data receiving terminal 20. Note that an example of an operation of the data sending terminal 10 is the same as the operation of the data sending terminal 10 according to the first exemplary embodiment.

As shown in FIG. 10, a procedure from Step 301 (S301) to Step 305 (S305) is the same as the procedure from Step 201 (S201) to Step 205 which is shown in the procedure of the operation of the data receiving terminal according to the first exemplary embodiment as an example.

In the case of resending ACK in Step 305 (S305), the data receiving terminal 20 advances the procedure to Step 306 (S306). In Step 306 (S306), the data receiving terminal 20 judges whether the data receiving terminal 20 receives new data from the data sending terminal 10 within the second predetermined time since ACK was resent.

In the case that new data is received within the second predetermined time, the data receiving terminal 20 returns the procedure to Step 301 (S301).

On the other hand, in the case that new data is not received within the predetermined time, the data receiving terminal 20 resends ACK in Step 307 (S307), and then returns the procedure to Step 306.

Third Exemplary Embodiment of the Present Invention

According to a third exemplary embodiment, ACK which the data receiving terminal 20 resends includes predetermined data (flag) which indicates that ACK is resent.

According to the third exemplary embodiment, the data sending terminal 10 uses both of the resending control by use of the timeout, and resending control which uses duplicate ACK, for example, on the basis of the operation of TCP/IP.

The resending control by use of the duplicate ACK will be described in the following with reference to a sequence diagram shown in FIG. 11.

In the example shown in FIG. 2 mentioned above, the data sending terminal 10 sends the new data in reply to receiving ACK which is corresponding to the sending data sent by the data sending terminal 10. On the other hand, in the example shown in FIG. 11, the data sending terminal 10 which is based on, for example, TCP/IP sends data up to a receivable amount of data (window size) of the data receiving terminal 20 with no relation to judgment whether the data sending terminal 10 receives ACK corresponding to the sending data. According to the example shown in FIG. 11, the data sending terminal 10 sends data 1 to data 5 to the data receiving terminal with no relation to the judgment whether the data sending terminal 10 receives ACK. Note that the data receiving terminal 20 which is based on, for example, the operation of TCP/IP informs the data sending terminal 10 of the receivable amount of data (window size) in advance.

Figure 11:
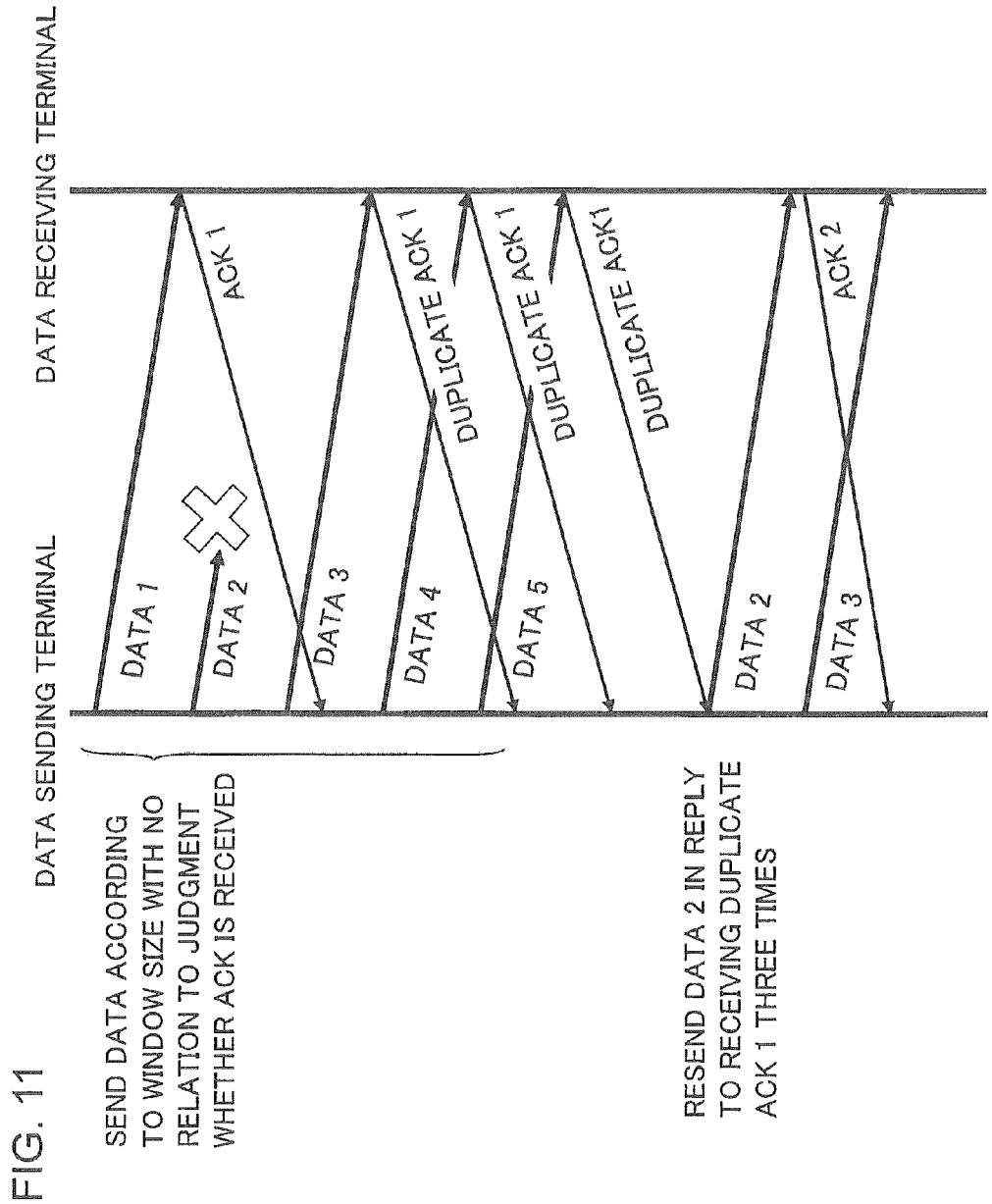

In the example shown in FIG. 11, the data receiving terminal 20 sends ACK 1 on the basis of receiving the data 1. According to the example shown in FIG. 11, the data 2 is lost in the network, and consequently the data receiving terminal 20 does not receive the data 2. Meanwhile, the data 3 is not lost in the network and the data receiving terminal 20 receives the data 3. In this case, the data receiving terminal 20 sends ACK 1 again on the basis of not receiving the data 2 and receiving the data 3. As a result, the data sending terminal 10 receives the sent ACK 1 (duplicate ACK 1). Also in the case that the data receiving terminal 20 does not receive the data 2 and receives the data 4 or the data 5, the data receiving terminal 20 sends ACK 1 again similarly.

When the data sending terminal 10 receives ACK 1, which is sent again, predetermined number of times, for example, receives ACK 1 three times in the case of TCP/IP, the data sending terminal 10 judges that the data 2 is lost in the network, and then resends the data 2.

As mentioned above, when the data sending terminal 10 receives the duplicate ACK predetermined number of times, for example, receives the duplicate ACK three times in the case of TCP/IP, the data sending terminal 10 judges that data is lost in the network, and then resends the data. Moreover, when the data sending terminal 10 receives the duplicate ACK predetermined number of times (for example, three times in the case of TCP/IP), the data sending terminal 10 reduces an amount of data.

Here, for example, in the case of TCP/IP, the data sending terminal 10 limits a data sending speed just after starting connection, and reduces an amount of sending data.

While not shown in the example of FIG. 11, the data sending terminal 10 may carry out the resending control by use of the timeout. In this case, the data sending terminal 10 sends data (data 1 to data 5 in the case of the example shown in FIG. 11) on the basis of the window size. In the case that the data sending terminal 10 cannot receive ACK (ACK 1 to ACK 5), which is corresponding to each data (data 1 to data 5), within the timeout period, the data sending terminal 10 resends the data (data 1 to data 5). Moreover, in the case that the data sending terminal 10 does not receive ACK (ACK 1 to ACK 5), which is corresponding to each sent data (data 1 to data 5), within the timeout period, the data sending terminal 10 limits the data sending speed, and reduces an amount of sending data.

Figure 12:
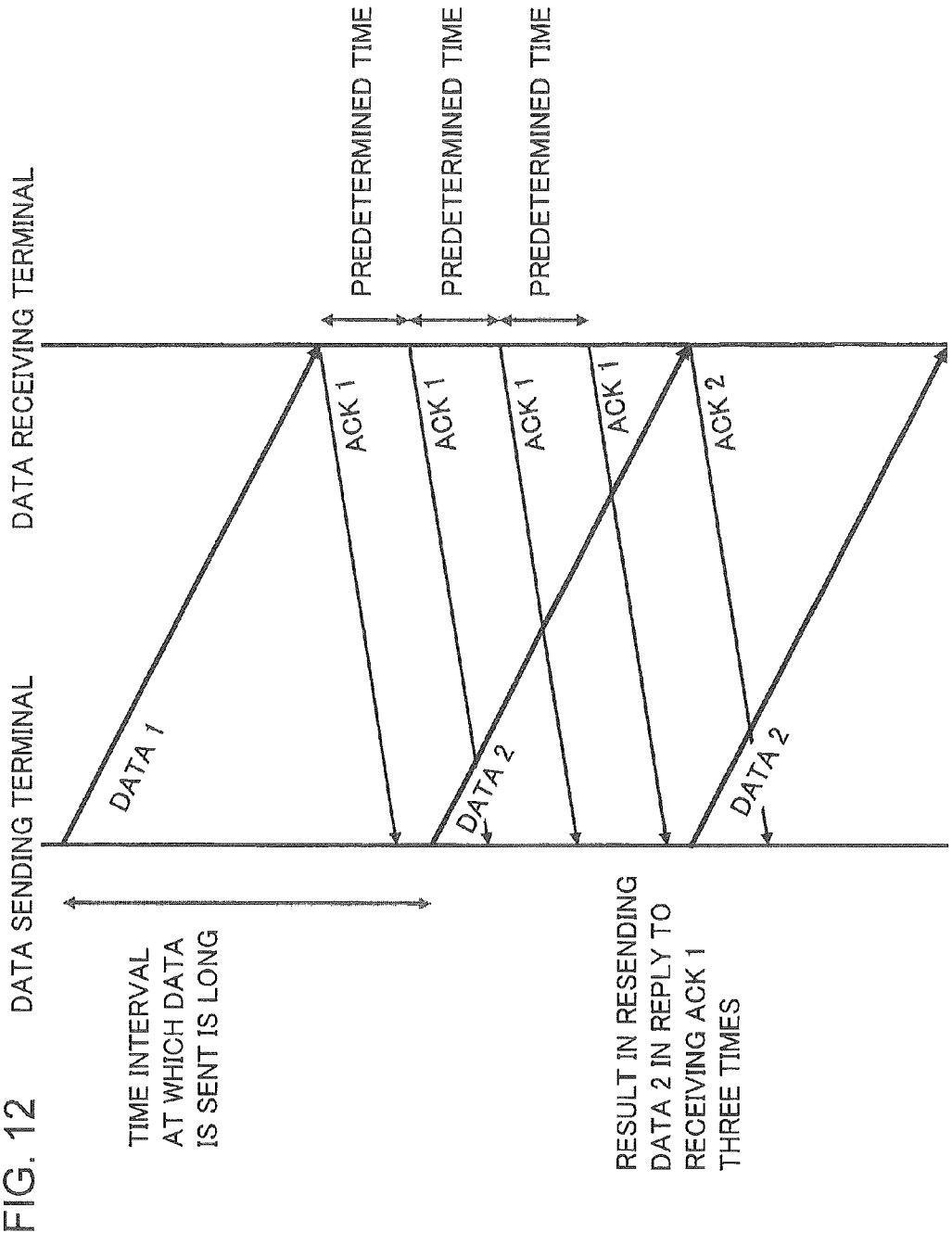

In the case that the data sending terminal 10 limits the data sending speed, a time interval at which the data sending terminal 10 sends data becomes long as shown in FIG. 12. In this case, the data receiving terminal 20 judges that it is necessary to resend ACK 1 on the basis of not receiving new data within the predetermined time since the data receiving terminal 20 sent ACK 1, and then resends ACK 1. According to the example shown in FIG. 12, the data receiving terminal 20 resends ACK 1 plural times.

In the example shown in FIG. 12, in the case that the data sending terminal 10 carries out the resending control by use of the duplicate ACK, when the data sending terminal 10 receives ACK 1 predetermined number of times (for example, three times in the case of TCP/IP), the data sending terminal 10 judges that the duplicate ACK 1 is received predetermined number of times. Then, the data sending terminal 10 resends data while loss of data is not caused. Moreover, the data sending terminal 10 results in limiting the data sending speed, and reducing an amount of data furthermore.

According to the third exemplary embodiment of the present invention, in order to solve the problem mentioned above, ACK which the data receiving terminal 20 resends includes predetermined data which indicates that ACK is resent. The data sending terminal 10 does not judge ACK, which includes the predetermined data, to be the duplicate ACK. Moreover, the data sending terminal 10 sends new data in reply to receiving ACK which includes the predetermined data. By virtue of the above-mentioned configuration, the data sending terminal 10 does not carry out unnecessary resending of data and does not reduce an amount of sending data unnecessarily.

In the third exemplary embodiment, the ACK resending part 2011, which is included in the receiving side TCP processing unit 201 of the data receiving terminal 20, makes the predetermined data included in ACK, which should be resent, when resending ACK.

In the case that the data sending terminal 10 receives ACK which includes the predetermined data, the data sending terminal 10 recognizes that ACK is received, and also recognizes that the received ACK is, for example, a data packet. Accordingly, even if the data sending terminal 10 receives ACK, which includes the predetermined data, predetermined number of times (for example, three times), the data sending terminal 10 does not judge that the duplicate ACK is received predetermined number of times, and consequently does not resend the data.

Note that the predetermined data which indicates the resending of ACK is, for example, OOB (Out Of Band) data. The OOB data is data which includes a predetermined flag, and it is possible to distinguish the OOB data from ordinary data. Therefore, it is possible for the data sending terminal 10 to judge that ACK including the OOB data is different from an ordinary ACK. Note that the predetermined data which indicates the resending of ACK is not limited to the OOB data, and any data may be applicable as far as the data sending terminal 10 can recognize the resending of ACK.

Figure 13:
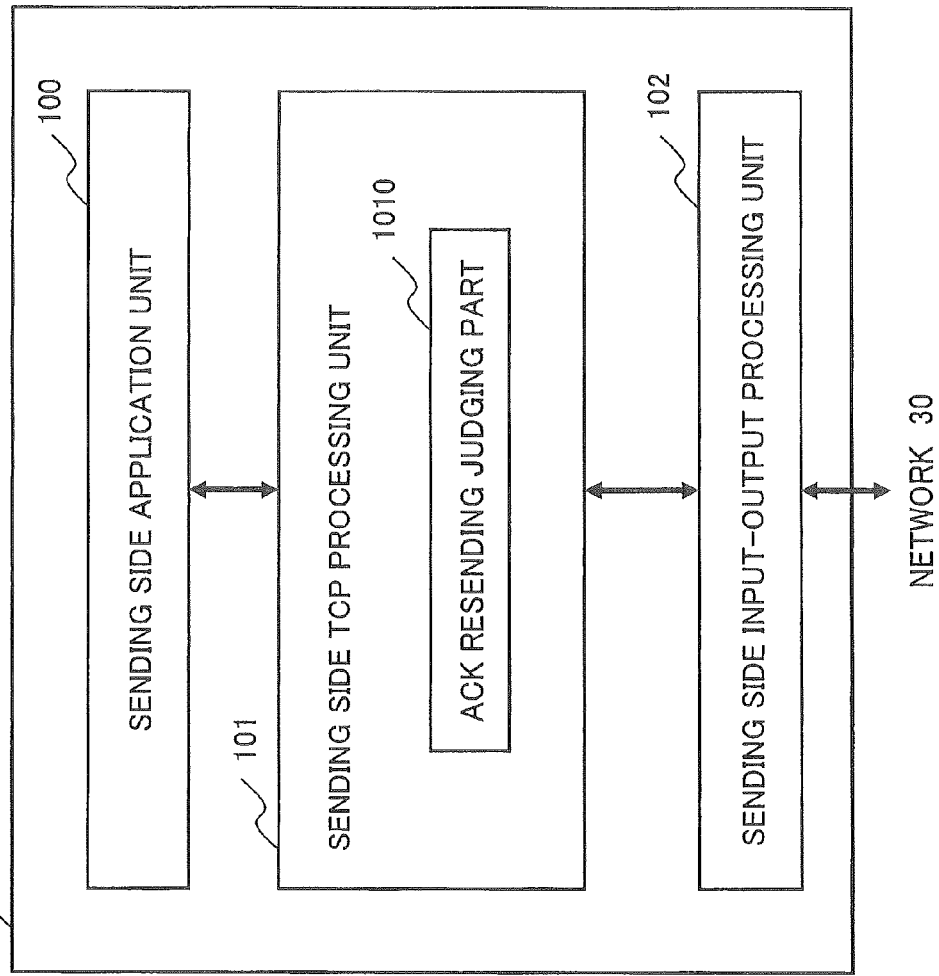

FIG. 13 is a diagram showing an example of a configuration of the data sending terminal 10 in the third exemplary embodiment. Meanwhile, an example of a configuration of the data receiving terminal 20 is, for example, the same as the configuration of the data receiving terminal 20 of the second exemplary embodiment.

As shown in FIG. 13, the sending side TCP processing unit 101 of the data sending terminal 10 includes an ACK resending judging part 1010. Moreover, a configuration of the sending side TCP processing unit 101 excluding the ACK resending judging part 1010 is the same as the configuration of the sending side TCP processing unit 101, for example, according to the second exemplary embodiment. The ACK resending judging part 1010 judges whether ACK received from the data receiving terminal 20 is a duplicate ACK which indicates data loss, or a resent ACK.

Specifically, the ACK resending judging part 1010 judges whether the received ACK includes the predetermined data which indicates that ACK is the resent ACK. In the case that the received ACK does not include the predetermined data, the ACK resending judging part 1010 judges that the received ACK is the duplicate ACK which indicates data loss.

On the other hand, in the case that it is judged that the received ACK includes the predetermined data, the data sending terminal 10 judges the received ACK to be the resent ACK, and sends new data to the data receiving terminal.

Next, an example of a communication procedure, which is carried out by the data sending terminal 10 and the data receiving terminal 20 according to the third exemplary embodiment, will be explained with reference to FIG. 14. Here, it is assumed that a part of the procedure which is not described in this specification is based on, for example, the communication operation of TCP/IP.

Figure 14:
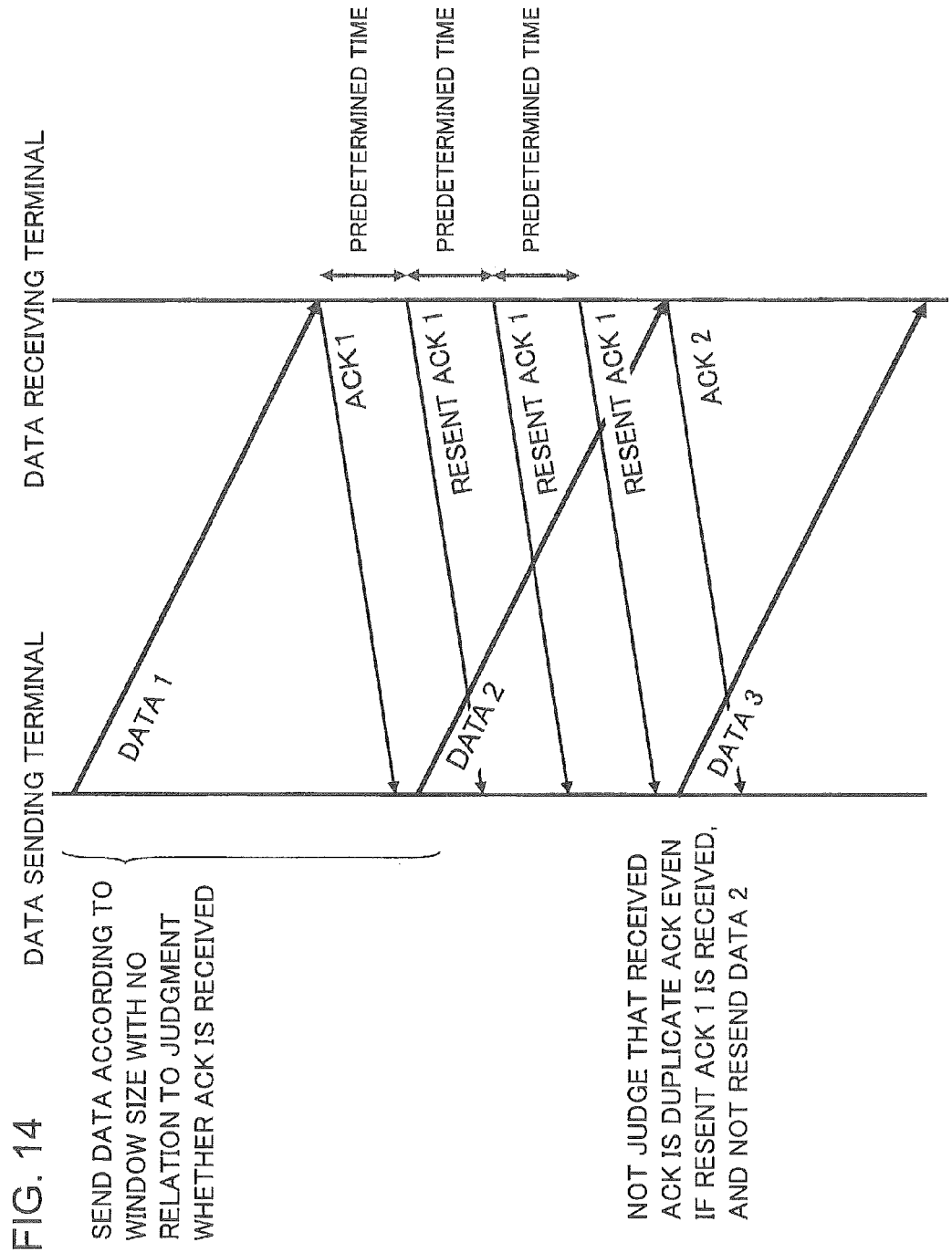

According to an example shown in FIG. 14, the data sending terminal 10 sends data 1 and data 2 according to the window size with no relation to judgment whether the data sending terminal 10 receives ACK. According to the example shown in FIG. 14, the data sending terminal 10 limits the data sending speed, and consequently the time interval at which data is sent is long. According to the example shown in FIG. 14, the time interval at which the data sending terminal 10 sends data is longer than a predetermined time which the data receiving terminal measures. The data receiving terminal 20 sends ACK 1 in reply to receiving the data 1. After the predetermined time since the data receiving terminal 20 sent ACK 1 expires, the data receiving terminal 20 sends ACK 1 (resending ACK 1), which includes the predetermined data indicating the resending of ACK 1, to the data sending terminal 10. According to the example shown in FIG. 14, the data receiving terminal 20 sends ACK 1 (resending ACK 1), which includes the predetermined data, every time when the predetermined time expires until the data receiving terminal 20 receives new data (data 2).

In the example shown in FIG. 14, the data sending terminal 10 receives ACK 1, which includes the predetermined data (resending ACK 1), predetermined number of times (for example, three times in the case of TCP/IP). But, since it is not judged that the duplicated ACK is received predetermined number of times, the data sending terminal 10 sends new data (data 3) to the data receiving terminal 20.

Figure 15:
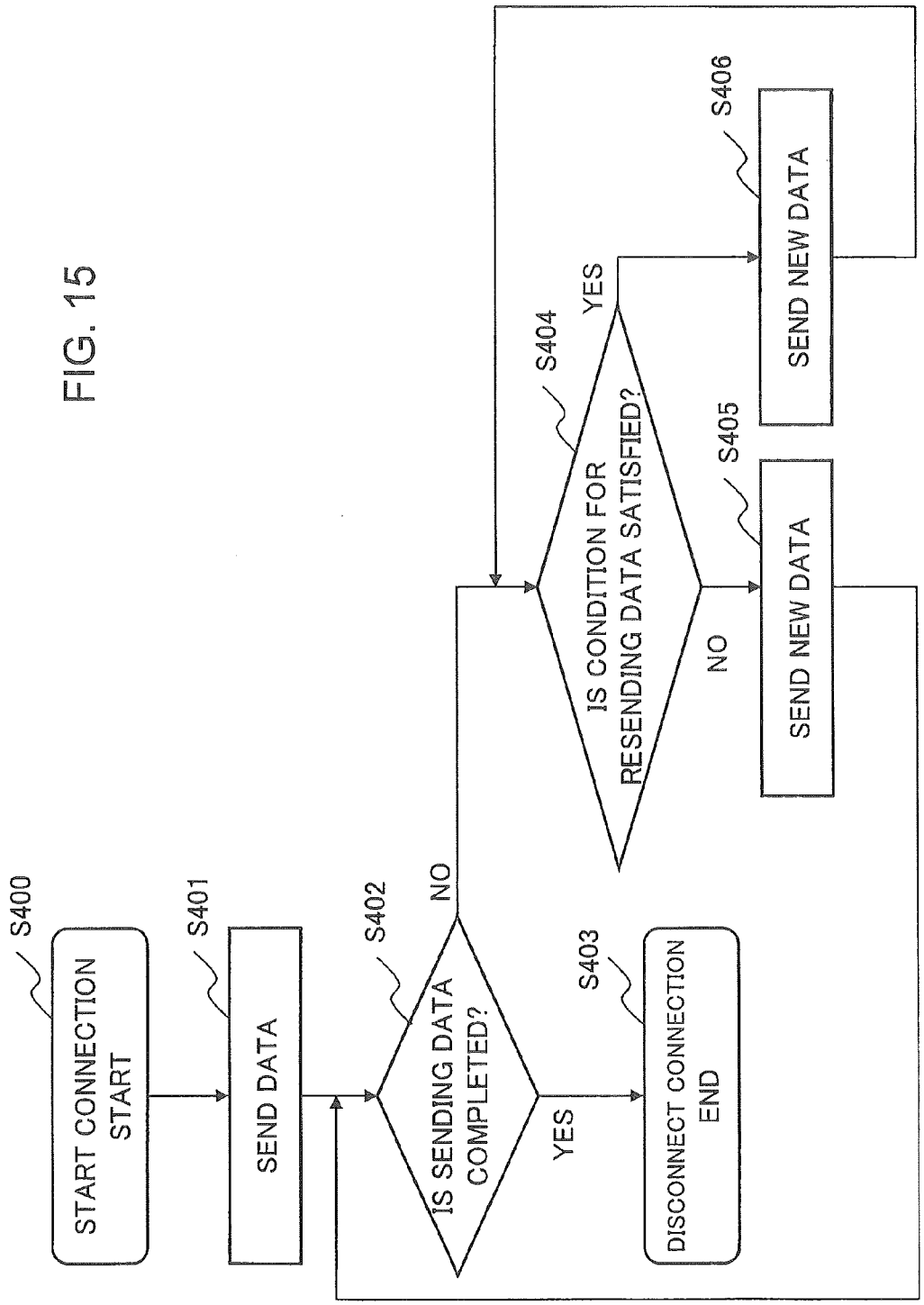

Next, an example of an operation of the data sending terminal 10 according to the third exemplary embodiment will be described. FIG. 15 is a flowchart showing an example of a procedure of the operation of the data sending terminal 10. Meanwhile, an example of an operation of the data receiving terminal 20 is the same as the operation of the data receiving terminal 20, for example, according to the first exemplary embodiment.

A procedure of Step 400 (S400) to Step 403 (S403) in the third exemplary embodiment is the same as the procedure of Step 100 (S100) to Step 103 (S103) carried out by the data sending terminal 10 in the first exemplary embodiment.

In Step 404 (S404), the data sending terminal 10 judges whether it is necessary to resend data.

The data sending terminal 10 judges whether a condition for resending data is satisfied (S404). As the condition for resending data, 'timeout' is exemplified. In the third exemplary embodiment, the data sending terminal 10 judges whether, within a timeout period since the data sending terminal 10 sent data based on the window size (for example, the data 1 to the data 5 shown in the example of FIG. 11), the data sending terminal 10 receives ACK or the resending ACK which correspond to each of the data.

In the case that the data sending terminal 10 receives ACK or the resending ACK, which correspond to each of the data based on the window size, within the timeout period, the data sending terminal 10 sends new data based on the window size (S405).

On the other hand, in the case that the data sending terminal 10 does not receive ACK or the resending ACK, which correspond to each of the data based on the window size, within the timeout period, the data sending terminal 10 resends the data (S406). When the data sending terminal 10 resends the data, the data sending terminal 10 judges again whether the condition for resending data is satisfied.

Fourth Exemplary Embodiment of the Present Invention

A fourth exemplary embodiment of the present invention is an example that a predetermined time is set according to a time interval at which the data sending terminal 10 sends data.

As shown in FIG. 12, if a predetermined time, which is used for judging by the data receiving terminal 20 whether it is necessary to resend ACK, is shorter than the time interval at which the data sending terminal 10 sends data, the data sending terminal 10 results in resending ACK. Therefore, there is a case that, if the data sending terminal 10 carries out the resending control of data by use of the duplicate ACK, the data sending terminal 10 carries out unnecessary resending of data. Moreover, there is a case that the data sending terminal 10 reduces an amount of sending data while the reduction is unnecessary originally.

According to the fourth exemplary embodiment of the present invention, in order to solve the problem mentioned above, the data receiving terminal 20 sets the predetermined time longer than the time interval at which the data sending terminal 10 sends data. By virtue of the setting mentioned above, it is possible to reduce number of the data receiving terminal 20's resending ACK, and it is possible to avoid the data sending terminal 10's resending data unnecessarily, and reducing an amount of sending data unnecessarily.

Examples of the data sending terminal 10 and the data receiving terminal 20 in the fourth exemplary embodiment of the present invention are the same as the data sending terminal 10 and the data receiving terminal 20, for example, according to the second exemplary embodiment.

In the fourth exemplary embodiment, the ACK resending part 2011 sets the predetermined time longer than the time interval at which the data sending terminal 10 sends data. The ACK resending part 2011 estimates the time interval, at which the data sending terminal 10 sends data, on the basis of, for example, the window size of which the data receiving terminal 20 informs the data sending terminal 10 as a receivable amount of data, and a sending speed at which the data sending terminal 10 sends data. Then, the ACK resending part 2011 sets the predetermined time longer than the estimated time interval at which data is send.

Next, an example of a communication procedure, which is carried out by the data sending terminal 10 and the data receiving terminal 20 according to the fourth exemplary embodiment of the present invention, will be explained with reference to FIG. 16. Here, it is assumed that a part of the procedure which is not described in this specification is based on, for example, the communication operation of TCP/IP.

Figure 16:
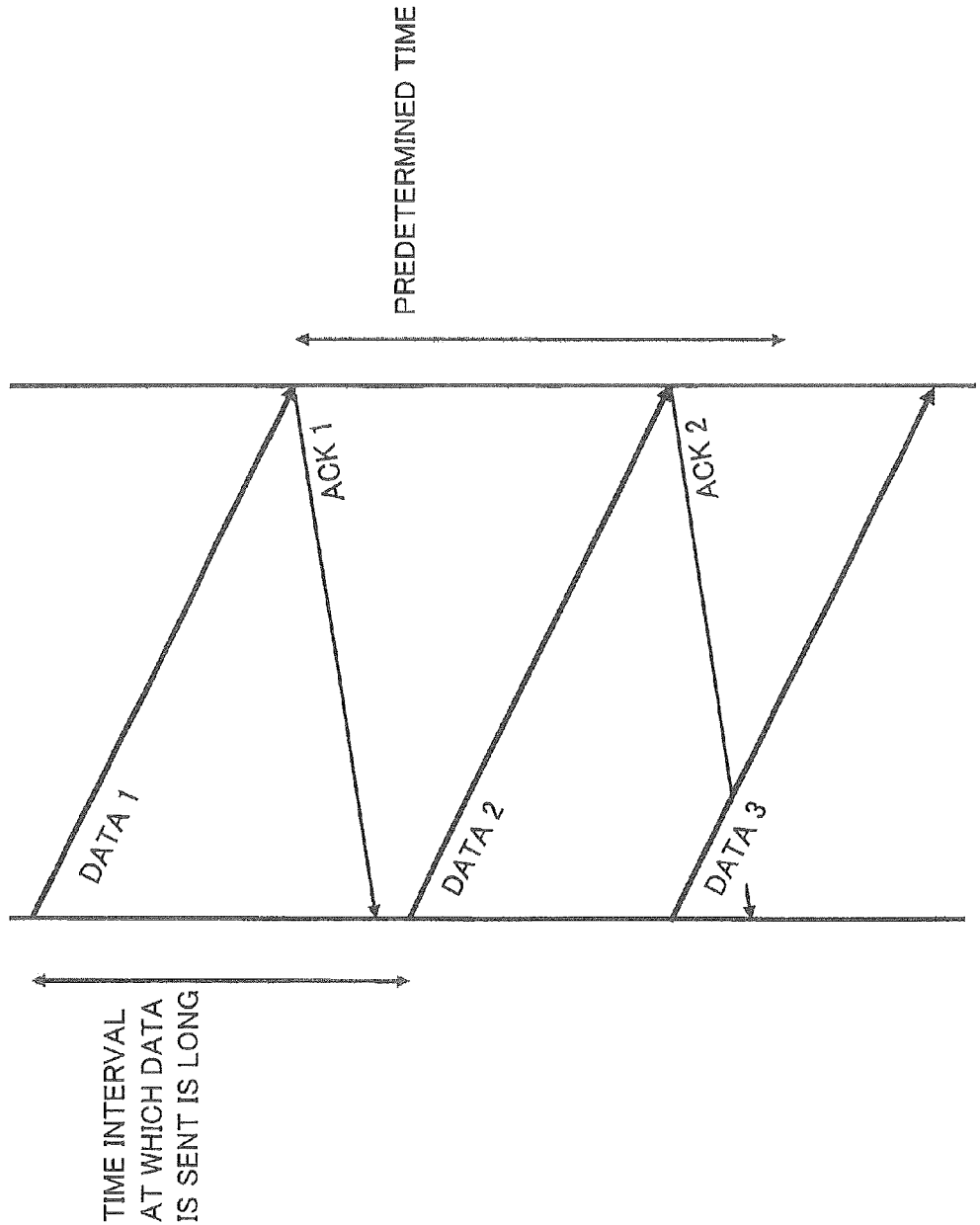

According to an example shown in FIG. 16, the data sending terminal 10 sends data 1 to data 3 according to the window size with no relation to judgment whether the data sending terminal 10 receives ACK. In the fourth exemplary embodiment, the predetermined time is longer than the time interval at which the data sending terminal 10 sends data. Therefore, the data receiving terminal 20, for example, receives the data 2 within the predetermined time since the data receiving terminal 20 sent ACK 1, and consequently does not resend ACK 1. Accordingly, since the data sending terminal 10 does not receive ACK 1 predetermined number of times (three times in the case of TCP/IP), the data sending terminal 10 does not resend data 2.

An example of operations of the data sending terminal 10 and the data receiving terminal 20 in the fourth exemplary embodiment of the present invention is the same as the operations of the data sending terminal 10 and the data receiving terminal 20, for example, according to the second exemplary embodiment of the present invention.

Fifth Exemplary Embodiment of the Present Invention

According to a fifth exemplary embodiment of the present invention, the data sending terminal 10 sends an ACK receiving notice, which indicates that ACK is received, to the data receiving terminal 20 in reply to the data sending terminal 10's receiving ACK. Moreover, according to the fifth exemplary embodiment of the present invention, the data receiving terminal 20 judges whether it is necessary to resend an acknowledgement, for example, on the basis of judgment whether the data receiving terminal 20 receives the ACK receiving notice from the data sending terminal 10 within a predetermined time since the data receiving terminal 20 sent ACK.

Figure 17:
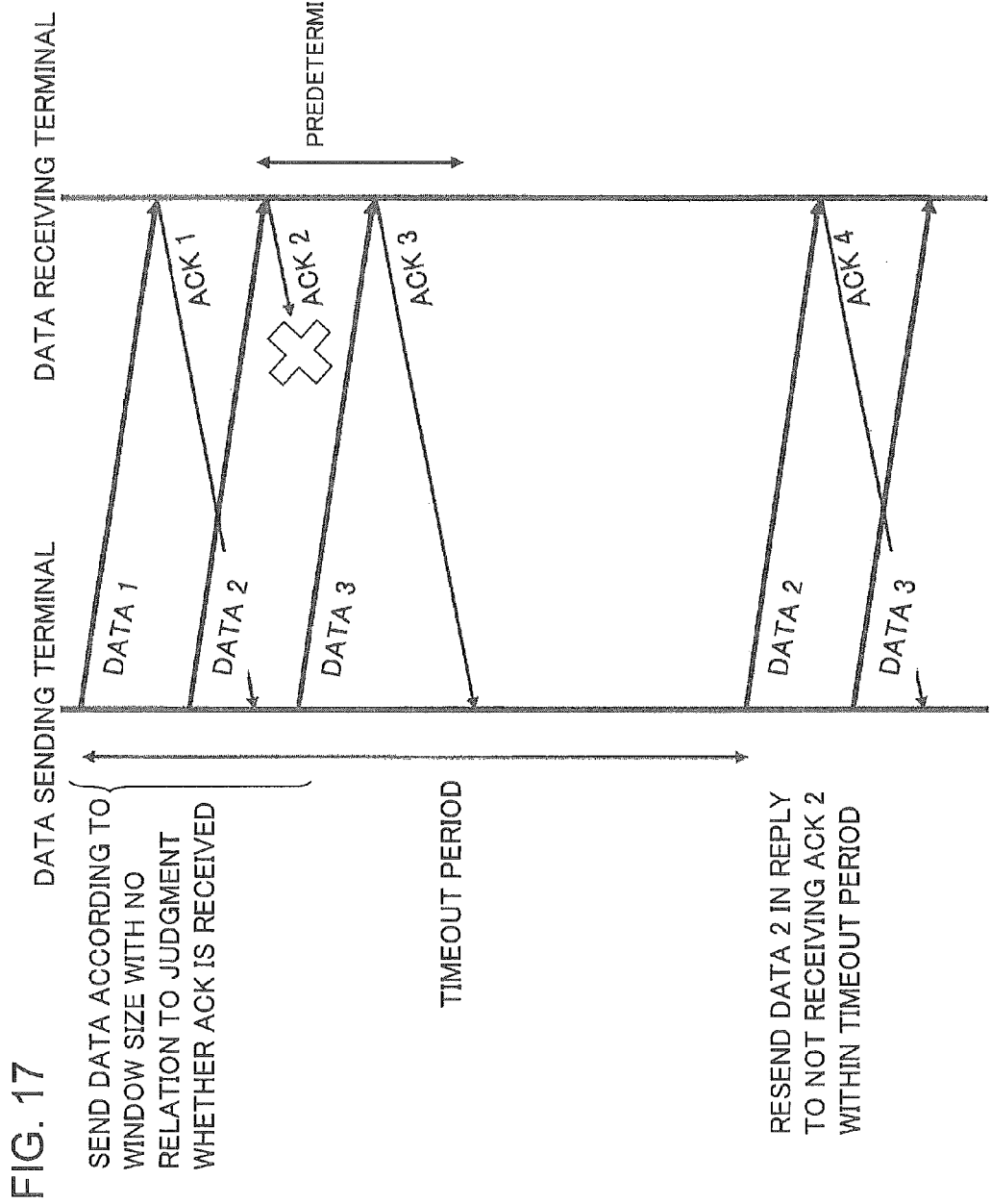

In FIG. 17, the data sending terminal 10 sends data 1 to data 3 according to the window size with no relation to judgment whether the data sending terminal 10 receives ACK. Here, it is assumed in the example shown in FIG. 17 that ACK 2 is lost in a network. Accordingly, the data sending terminal 10 does not receive ACK 2 corresponding to the data 2. Meanwhile, the data receiving terminal 20 does not resend ACK 2 because the data receiving terminal 20 receives the data 3 within the predetermined time since the data receiving terminal 20 sent ACK 2. In FIG. 17, in the case that the data sending terminal 10 carries out the resending control by use of the timeout, the data sending terminal 10 results in resending the data 2 since the data sending terminal 10 does not receive ACK 2 within the predetermined time, while the data 2 is not lost. Moreover, the data sending terminal 10 results in reducing an amount of sending data in reply to the data sending terminal 10's not receiving ACK 2 within the timeout period.

According to the fifth exemplary embodiment, in order to solve the problem mentioned above, the data sending terminal 10 sends an ACK confirming notice in reply to the data sending terminal 10's receiving ACK. Accordingly, the data receiving terminal 20 can judge whether the data sending terminal 10 receives ACK on the basis of judgment whether the data receiving terminal 20 receives the ACK receiving notice. Moreover, on the basis that the data receiving terminal 20 does not receive the ACK receiving notice, which is corresponding to ACK sent by the data receiving terminal 20, within the predetermined time since the data receiving terminal 20 sent ACK, the data receiving terminal 20 judges that ACK is lost in the network, and resends ACK. Accordingly, the data sending terminal 10 can receive ACK, which the data receiving terminal 20 resends, within the timeout period, and consequently does not resend data and does not reduce an amount of sending data.

Figure 18:
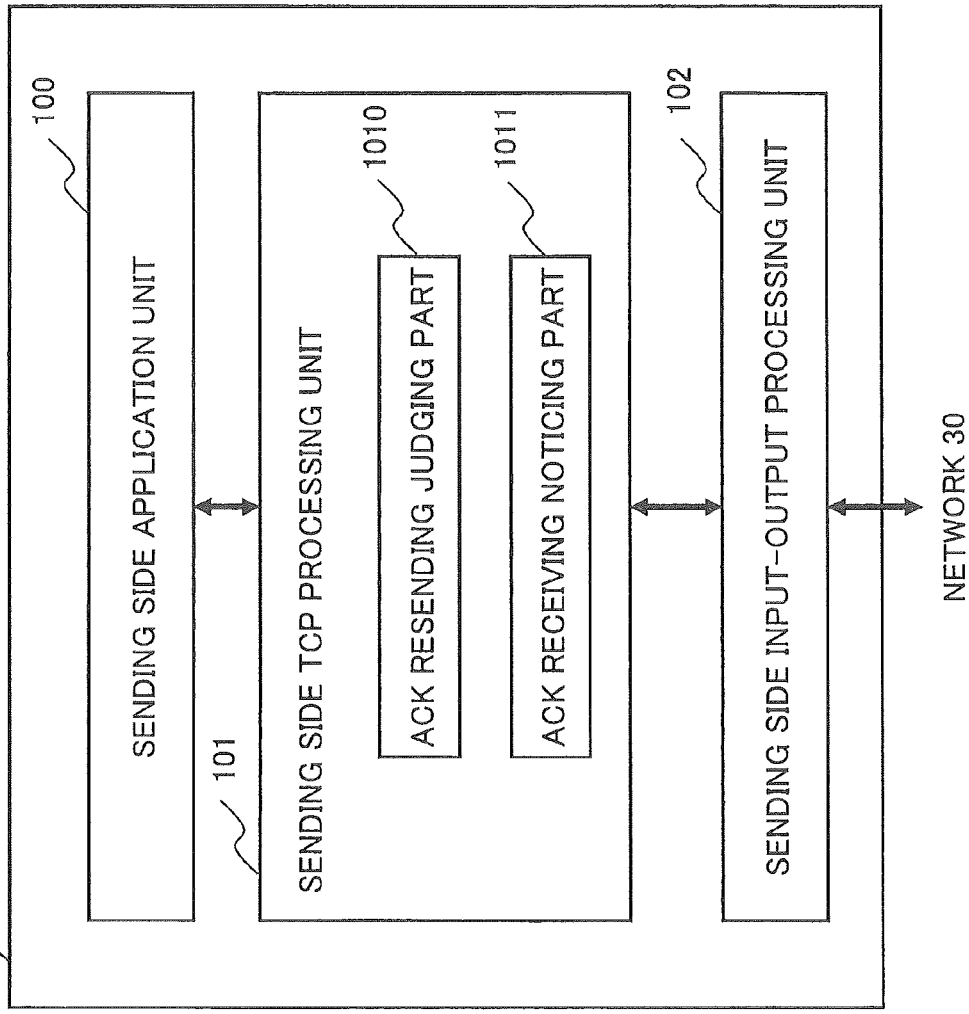

FIG. 18 is a diagram showing an example of a configuration of the data sending terminal 10 in the fifth exemplary embodiment. As shown in FIG. 18, the sending side TCP processing unit 101 of the data sending terminal 10 includes an ACK receiving noticing part 1011 which sends the ACK receiving notice in reply to the data sending terminal 10's receiving ACK. Meanwhile, the example of the configuration of the data sending terminal 10 excluding the ACK receiving noticing part 1011 is the same as the configuration of the data sending terminal 10, for example, according to the third exemplary embodiment.

The ACK receiving noticing part 1011 sends the ACK receiving notice, which indicates that ACK is received, to the data receiving terminal 20 in reply to the data sending terminal 10's receiving ACK.

An example of a configuration of the data receiving terminal 20 in the fifth exemplary embodiment is the same as the configuration of the data receiving terminal 20, for example, according to the second exemplary embodiment.

In the fifth exemplary embodiment, the data receiving terminal 20 judges whether each ACK, which the data receiving terminal 20 sends, satisfies a condition for resending ACK.

In the fifth exemplary embodiment, the resending timer 2014 of the data receiving terminal 20 measures an elapse time since the data receiving terminal 20 sent ACK for every sent ACK. The ACK resending part 2011 judges whether the ACK receiving notice, which is corresponding to each the sent ACK, were received within the predetermined time. Then, in the case that the ACK receiving notice were not received within the predetermined time, the ACK resending part 2011 resends the corresponding ACK.

NEXT, an example of a procedure, which is carried out by the data sending terminal 10 and the data receiving terminal 20 according to the fifth exemplary embodiment of the present invention, will be explained with reference FIG. 19. Here, it is assumed that a part of the procedure which is not described in this specification is based on, for example, the general communication operation of TCP/IP.

According to an example shown in FIG. 19, the data sending terminal 10 sends data 1 to data 3 according to the window size with no relation to judgment whether the data sending terminal 10 receives ACK. The data receiving terminal 20, which receives the data 1 to the data 3, sends ACK (ACK 1 to ACK 3), which is corresponding to each the data, to the data sending terminal. The data sending terminal 10 sends the ACK receiving notice to the data receiving terminal 20 in reply to the data sending terminal 10's receiving ACK. For example, the data sending terminal 10 sends an ACK receiving notice 1 in reply to the data sending terminal 10's receiving ACK 1.

In the example shown in FIG. 19, the data receiving terminal 20 receives the ACK receiving notice 1 within the predetermined time since the data receiving terminal 20 sent ACK 1. Therefore, the data receiving terminal 20 judges that it is unnecessary to resend ACK 1. Moreover, according to the example shown in FIG. 19, the data receiving terminal 20 receives an ACK receiving notice 3 within the predetermined time since the data receiving terminal 20 sent ACK 3. Therefore, the data receiving terminal 20 judges that it is unnecessary to resend ACK 3.

Meanwhile, in the example shown in FIG. 19, ACK 2 is lost in the network. Therefore, the data sending terminal 10 does not receive ACK 2, and consequently does not send an ACK receiving notice 2 which is corresponding to ACK 2. Accordingly, the data receiving terminal 20 does not receive the ACK receiving notice 2 from the data sending terminal 10 within the predetermined time. Then, the data receiving terminal 20 judges that it is necessary to resend ACK 2 on the basis that the data receiving terminal 20 does not receive the ACK receiving notice 2 within the predetermined time, and then resends ACK 2. As a result, the data sending terminal 10 receives all ACKs (ACKs 1 to 3), which include the resent ACK 2 and which are corresponding to the data 1 to the data 3 respectively, within the timeout period, and consequently the data sending terminal 10 does not resend data (data 1 to data 3) based on the window size.

Next, an example of an operation of the data sending terminal 10 according to the fifth exemplary embodiment of the present invention will be explained. FIG. 20 is a flowchart showing a procedure of the operation of the data sending terminal 10 in the fifth exemplary embodiment of the present invention.

A procedure of Step 500 (S500) to Step 504 (S504) in the fifth exemplary embodiment is the same as the procedure of Step 100 (S100) to Step 104 (S104) which are carried out by the data sending terminal 10 according to the first exemplary embodiment.

In the case that the data sending terminal 10 receives all ACKs (ACK 1 to ACK 3), which are corresponding to the data based on the window size (data 1 to data 3 in the case of the example shown in FIG. 19), within the timeout period, the data sending terminal 10 sends new data (for example, data 4 to data 6) based on the window size (S505).

On the other hand, in the case that the data sending terminal 10 does not receive all ACKs (ACK 1 to ACK 3), which are corresponding to the data based on the window size (data 1 to data 3 in the case of the example shown in FIG. 19), within the timeout period, the data sending terminal 10 resends the corresponding data (data 1 to data 3 in the case of the example shown in FIG. 19) (S506). In the case of resending the data, the data sending terminal judges again whether the condition for resending data is satisfied.

Next, an example of an operation of the data receiving terminal 20 according to the fifth exemplary embodiment of the present invention will be explained. FIG. 21 is a flowchart showing a procedure of the operation of the data receiving terminal 20 in the fifth exemplary embodiment of the present invention.

A procedure of Step 600 (S600) to Step 603 (S603) in the fifth exemplary embodiment is the same as the procedure of Step 200 (S200) to Step 203 (S203) which are carried out by the data receiving terminal 10 according to the first exemplary embodiment.

In the case that, in Step 602 (S602), the data receiving terminal 20 judges that the received data is not data which indicates disconnection of connection, the data receiving terminal 20 advances the procedure to Step 604 (S604). That is, the data receiving terminal 20 judges whether, within the predetermined time since the data receiving terminal 20's sending ACK, the data receiving terminal 20 receives the ACK receiving notice, which is corresponding to the sent ACK, from the data sending terminal 10.

In the case that the data receiving terminal 20 receives the ACK receiving notice, which is corresponding to the sent ACK, within the predetermined time, the data receiving terminal 20 returns the procedure to Step 601 (S601).

On the other hand, in the case that the data receiving terminal 20 does not receive the ACK receiving notice, which is corresponding to the sent ACK, within the predetermined time, the data receiving terminal 20 resends ACK in Step 605 (S605), and returns the procedure to Step 604.

It is possible to combine the first to the fifth exemplary embodiments of the present invention appropriately. Furthermore, the present invention is not limited to each exemplary embodiment mentioned above. Various changes to the configuration and detail of the invention according to the present application, which are able to be understood by a person skilled in the art, can be made within the scope of the invention according to the present application.

This application is based upon and claims the benefit of priority from Japanese Patent Application No. 2012-035401, filed on Feb. 21, 2012, the disclosure of which is incorporated herein in its entirety by reference.

REFERENCE SIGNS LIST

10 data sending terminal
20 data receiving terminal
30 network
50 communication system
100 sending side input-output processing unit
101 sending side TCP processing unit
102 sending side application unit
200 receiving side input-output processing unit
201 receiving side TCP processing unit
202 receiving side application unit
1010 ACK resending judging part
1011 ACK receiving noticing part
2010 ACK replying part
2011 ACK resending part
2012 data processing part
2013 storage part
2014 resending timer

The invention claimed is:

1. A communication system, comprising:
a data sending unit that sends data; and
a data receiving unit for sending an acknowledgement which indicates receiving the data to the data sending unit in reply to receiving the data, wherein
the data receiving unit includes a part that judges whether it is necessary to resend the acknowledgement on the basis of judgment whether the data receiving unit receives new data from the data sending unit within a predetermined time since the data receiving terminal sent the acknowledgement, wherein
the data receiving unit includes a part that sets the predetermined time shorter than a time interval at which the data sending unit resends the data.

2. The communication system according to claim 1, wherein
the data receiving unit further includes a part that stores predetermined data, which indicates resending, in the acknowledgement to be resent.

3. The communication system according to claim 2, wherein
the data sending unit includes a part that distinguishes the acknowledgement, and the acknowledgement which stores the predetermined data.

4. The communication system according to claim 1, wherein
the data sending unit includes:
a part that sends an acknowledgement receiving notice, which indicates that the acknowledgement is received, in reply to receiving the acknowledgement; and
a part that judges whether it is necessary to resend the acknowledgement on the basis of judgment whether the acknowledgement receiving notice is received from the data sending unit within a predetermined time since sending the acknowledgement.

5. A communication system, comprising:
a data sending unit that sends data; and
a data receiving unit for sending an acknowledgement which indicates receiving the data to the data sending unit in reply to receiving the data, wherein
the data receiving unit includes a part that judges whether it is necessary to resend the acknowledgement on the basis of judgment whether the data receiving unit receives new data from the data sending unit within a predetermined time since the data receiving terminal sent the acknowledgement, wherein
the data receiving unit includes:
a part that measures an elapse time since sending the acknowledgement;
a part that resends the acknowledgement in reply to the elapse time's reaching the predetermined time; and
a part that stops measuring the elapse time in reply to receiving the new data.

6. A communication
a data sending unit that sends data; and
a data receiving unit for sending an acknowledgement which indicates receiving the data to the data sending unit in reply to receiving the data, wherein
the data receiving unit includes a part that judges whether it is necessary to resend the acknowledgement on the basis of judgment whether the data receiving unit receives new data from the data sending unit within a predetermined time since the data receiving terminal sent the acknowledgement, wherein the data receiving unit includes:

a part that calculates a time interval at which the data is received; and a part that sets the predetermined time on the basis of the calculated time interval.

7. A data receiving terminal which receives data sent by a data sending terminal, comprising:

a first processing unit that sends an acknowledgement which indicates that the data is received to the data sending terminal in reply to receiving the data; and a second processing unit that judges whether it is necessary to resend the acknowledgement on the basis of judgment whether new data is received from the data sending terminal within a predetermined time since sending the acknowledgement, wherein the second processing unit further includes:

a part that measures an elapse time since sending the acknowledgement;

a part that resends the acknowledgement in reply to the elapse time's reaching the predetermined time; and a part that stops measuring the elapse time in reply to receiving the new data.

8. A communication method, comprising:

sending an acknowledgement which indicates that data sent by a data sending terminal is received to the data sending terminal in reply to receiving the data; and judging whether it is necessary to resend the acknowledgement on the basis of judgment whether new data is received from the data sending terminal within a predetermined time since sending the acknowledgement; and setting the predetermined time shorter than a time interval at which the data sending terminal resends the data.

* * * * *